(12) United States Patent
Xu et al.

(10) Patent No.: US 12,195,209 B2
(45) Date of Patent: Jan. 14, 2025

(54) SEARCH AND TRACKING METHOD FOR FULL TIME-DOMAIN LASER DETECTION OF SPACE DEBRIS, STORAGE MEDIUM, AND ELECTRONIC DEVICE

(71) Applicant: Purple Mountain Observatory, Chinese Academy of Sciences, Nanjing (CN)

(72) Inventors: Jin Xu, Nanjing (CN); Zhibin Cao, Nanjing (CN); Kejun Liu, Nanjing (CN); Jianli Du, Nanjing (CN); Jianbo Ma, Nanjing (CN); Dong Yang, Nanjing (CN)

(73) Assignee: Purple Mountain Observatory, Chinese Academy of Sciences, Nanjing (CN)

(*) Notice: Subject to any disclaimer, the term of this patent is extended or adjusted under 35 U.S.C. 154(b) by 0 days.

(21) Appl. No.: 18/426,390

(22) Filed: Jan. 30, 2024

(65) Prior Publication Data

US 2024/0199241 A1 Jun. 20, 2024

Related U.S. Application Data

(63) Continuation of application No. PCT/CN2023/077323, filed on Feb. 21, 2023.

(30) Foreign Application Priority Data

Nov. 29, 2022 (CN) .......................... 202211512780.9

(51) Int. Cl.
*B64G 3/00* (2006.01)
*B64G 1/24* (2006.01)
(Continued)

(52) U.S. Cl.
CPC ............... *B64G 3/00* (2013.01); *B64G 1/242* (2013.01); *B64G 1/68* (2013.01); *G01S 13/865* (2013.01);
(Continued)

(58) Field of Classification Search
CPC .. B64G 3/00; B64G 1/242; B64G 1/68; G01S 13/865; G01S 13/933; G01S 17/66; G01S 17/87; G01S 17/933
See application file for complete search history.

(56) References Cited

U.S. PATENT DOCUMENTS 7,020,046 B1 3/2006 Baylog et al.
2009/0147238 A1 6/2009 Markov et al.
(Continued)

FOREIGN PATENT DOCUMENTS

CN 102930047 A 2/2013
CN 107003407 A 8/2017
(Continued)

OTHER PUBLICATIONS

Bin Li, et al, A Real-Time Orbit Determination Method for Smooth Transition from Optical Tracking to Laser Ranging of Debris, Sensors, 2016, pp. 1-14, vol. 16, 962.
(Continued)

*Primary Examiner* — Catherine T. Rastovski
*Assistant Examiner* — Yossef Korang-Beheshti
(74) *Attorney, Agent, or Firm* — Bayramoglu Law Offices LLC

(57) ABSTRACT

In a search and tracking method for full time-domain laser detection of space debris, a set of latest precision orbital parameters of a debris object and start and end moments of a current transit of the object are first obtained. Search-specific guidance data is generated based on the above information and in combination with estimation of a maxi-
(Continued)

mum along-track error of the orbital parameters of the object during the current transit. A DLR system performs multi-elevation search on the object based on the search-specific guidance data, obtains a plurality of pieces of detection data of the object after detecting the object during the search, determines an along-track error of the orbital parameters of the object based on the detection data, and corrects the orbital parameters of the object in real time based on the along-track error, so as to guide the DLR system to subsequently track and detect the object.

17 Claims, 12 Drawing Sheets

(51) Int. Cl.
| | | |
|---|---|---|
| *B64G 1/68* | (2006.01) | |
| *G01S 13/86* | (2006.01) | |
| *G01S 13/933* | (2020.01) | |
| *G01S 17/66* | (2006.01) | |
| *G01S 17/87* | (2020.01) | |
| *G01S 17/933* | (2020.01) | |

(52) U.S. Cl.
CPC ............ *G01S 13/933* (2020.01); *G01S 17/66* (2013.01); *G01S 17/87* (2013.01); *G01S 17/933* (2013.01)

(56) References Cited

U.S. PATENT DOCUMENTS

| | | |
|---|---|---|
| 2012/0027298 A1 | 2/2012 | Dow et al. |
| 2014/0074767 A1* | 3/2014 | Horwood ................ B64G 3/00 706/52 |
| 2017/0229831 A1 | 8/2017 | Hersman et al. |
| 2018/0032082 A1 | 2/2018 | Shalev-Shwartz et al. |
| 2019/0369637 A1 | 12/2019 | Shalev-Shwartz et al. |

FOREIGN PATENT DOCUMENTS

| | | | |
|---|---|---|---|
| CN | 109358071 A | | 2/2019 |
| CN | 110261841 A | | 9/2019 |
| CN | 113640787 A | * | 11/2021 |
| CN | 114280572 A | | 4/2022 |
| CN | 115384486 A | | 11/2022 |

OTHER PUBLICATIONS

Jizhang Sang, et al., Achievable debris orbit prediction accuracy using laser ranging data from a single station, Advances in Space Research, 2014, pp. 1-6.

Michael A. Steindorfer, et al., Daylight space debris laser ranging, Nature Communications, 2020, pp. 1-7, 11:3735.

Michael A. Steindorfer, et al., Stare and Chase: Optical Pointing Determination, Orbit Calculation and Satellite Laser Ranging Within a Single Pass, Proc. 7th European Conference on Space Debris, 2017.

J. Rodriguez, et al., The New Stare & Chase Procedure at the Swiss Optical Ground Station and Geodynamics Observatory Zimmerwald, Proc. 1st NEO and Debris Detection Conference, 2019.

Huang Shangxiao, The Research on Searching, Catching, Tracking Method for Monopulse Tracking Receiving System, Modern Radar, 1998, pp. 66-72.

Zhang Haifeng, et al., Observations of space debris by ground-based laser ranging system, Spacecraft Environment Engineering, 2016, pp. 457-462, vol. 33, No. 5.

Lei Xiangxu, et al., Association of Very-Short-Arc Angles Data for LEO Space Objects, Geomatics and Information Science of Wuhan University, 2020, pp. 1526-1532, vol. 45, No. 10.

Dong Xue, et al., Research of space debris laser ranging system, Infrared and Laser Engineering, 2016, pp. 1-6, vol. 45, No. S2.

Li Yuqiang, et al., Experimentation of Diffuse Reflection Laser Ranging of Space Debris, Chinese Journal of Lasers, 2011, pp. 0908001-1-0908001-1-5, vol. 38, No. 9.

* cited by examiner

SEARCH AND TRACKING METHOD FOR FULL TIME-DOMAIN LASER DETECTION OF SPACE DEBRIS, STORAGE MEDIUM, AND ELECTRONIC DEVICE

CROSS REFERENCE TO THE RELATED APPLICATIONS

This application is the continuation application of International Application No. PCT/CN2023/077323, filed on Feb. 21, 2023, which is based upon and claims priority to Chinese Patent Application No. 202211512780.9, filed on Nov. 29, 2022, the entire contents of which are incorporated herein by reference.

TECHNICAL FIELD

The present disclosure relates to the field of space exploration, and specifically, to a search and tracking method for full time-domain laser detection of space debris, a storage medium, and an electronic device.

BACKGROUND

At the beginning of this century, to ensure the safety of an in-orbit spacecraft during operation, increasing attention is paid to collision avoidance and active clearance technologies for space debris (including defunct satellites, rocket wreckage, and debris generated by object disintegration, collision, explosion, and the like). Effective implementation of these technologies depends on accurate acquisition and prediction of the orbit of the space debris. However, the accuracy of debris orbit determination based on radar and optical measurement data are difficult to meet the requirements of those technologies. Therefore, a debris laser ranging (DLR) technology has become a new development direction.

Essentially, there is no difference between the DLR technology and a satellite laser ranging (SLR) technology in terms of the detection principle, and both the DLR technology and the SLR technology obtain the range of a space object by measuring the round-trip time of a laser signal from a ground station to the space object. However, the DLR technology faces a greater technical challenge and difficulty due to different detection objects, and there are two key technical problems that need to be resolved. The first problem is related to detection of echo signals. The detection object of the SLR technology is a cooperative object. For a laser beam emitted by a system, the vast majority of photons can be reflected back by retroreflectors of the object according to the original path, making it easy to detect the echo signals. However, the detection object of the DLR technology is space debris (non-cooperative object). For the laser beam emitted by the system, only a very small proportion of photons can return to the ground station by diffuse reflection from target surface, making it difficult to detect the echo signals. The second problem is related to generation of echo signals, and the laser beam emitted by the system is required to be able to detect (hit) the debris and generate echo signals, thereupon. This is usually achieved through observation guidance provided by orbit prediction of the object. Because the laser beam is extremely narrow, high accuracy is required for the orbit prediction. For a small quantity of cooperative space objects targeted by the SLR technology, a high-precision ephemeris file (CPF) updated and published daily by the International Laser Ranging Service (ILRS) can be used to achieve sufficient accurate orbital predictions of the object to guide a SLR system to effectively track and measure the object. However, for a general debris object targeted by the DLR technology, such a high-precision ephemeris is unavailable.

In order to make the laser beam to detect and track the debris object, the optical guidance method is currently used worldwide. Firstly, an optical telescope or astronomical camera with a large field of view is used to search and detect the object to obtain a certain amount of angle observation data. Then the laser beam is guided to detect and track the object (see non-patent documents 1-3).

In consideration of the dependence of current debris laser detection on an optical device, application of the DLR technology is greatly limited for the following reasons. First, optical measurement is generally constrained by skylight and Earth shadow conditions, which limits the DLR technology to only being effectively implemented around twilight (within these few hours, space debris on orbit is illuminated by the sun while the ground laser ranging station is still in darkness). In addition, due to being limited by laser energy, at present, the DLR technology can only effectively detect the low earth orbit (LEO) debris with a range of no more than 3,000 kilometers. Since it usually takes a long time for the low earth orbit (LEO) debris to pass through the Earth's shadow, after daylight at the laser station and the time the object passing through the Earth's shadow are deducted, it is estimated that a total time window available for DLR detection does not exceed 6 hours (see non-patent document 4). This not only causes a great waste of detection resources, but also results in unsatisfactory orbital phase distribution of measurement data, which is not conducive to effective improvement of the accuracy of debris orbit determination, thus seriously reducing application efficacy of DLR technology. In order to effectively expand the time window of DLR detection, a daylight space debris laser detection technology has been explored internationally in recent years (see non-patent document 4). Implementation of the daylight space debris laser detection technology mainly benefits from the improvement of optical observation technology. The daylight space debris laser detection technology still relies on optical guidance and does not fully eliminate the impact of noise, such as a skylight background. Therefore, only a small quantity of close-range debris with large size could be detected by daylight laser ranging currently, which means the application efficacy of DLR technology is still significantly limited. With further improvement of the optical observation technology, even if the capability of space debris daylight laser detection is significantly improved in the future, the time window problem within the DLR detection still exists due to optical invisibility of a debris object in the Earth's shadow region.

In summary, the time window problem has become a main technical bottleneck that restricts the application efficacy of the current DLR technology. The time window is generated due to initial guidance of optical observation during implementation of the DLR technology. However, for the SLR technology, due to the guidance of high-precision orbital predictions, there is no time window problem in the application process, and laser detection can be achieved 24 hours a day. Therefore, the generation of the time window is not necessarily related to the DLR technology itself. If the debris object can still be detected and tracked without relying on guidance of the optical device, the DLR system will fundamentally break through the limitation of the time window, and its application efficacy will be essentially improved. In view of this, the present disclosure proposes a search and tracking method that can achieve full time-domain laser detection of the space debris, along with the corresponding storage medium and electronic device. Referring to the Chinese patent with a publication number "CN113640787A" and titled "Constant Elevation Search Method for Space Object Capturing Using Narrow Beam Radar" (see patent document 1), a detection process of the debris search and tracking method is still divided into a constant elevation search process and a tracking process after detecting the object. However, since laser beam for detection is much narrower than radar's (a beam diameter of the DLR system generally does not exceed 20 arc seconds, while a beam diameter of the narrow beam radar is usually not less than 200 arc seconds, in other words, there is a difference of magnitude between the beam diameter of the DLR system and the beam diameter of the narrow beam radar), the DLR system and the narrow beam radar have significantly different technical requirements for object search and tracking.

CITED DOCUMENTS

Non-Patent Documents

1. Bin Li, Jizhang Sang and Zhongping Zhang, A Real-Time Orbit Determination Method for Smooth Transition from Optical Tracking to Laser Ranging of Debris, Sensors, 16, 962, 2016.
2. Michael A. Steindorfer, Georg Kirchner, Franz Koidl, Peiyuan Wang, Alfredo Anton, Jaime Fernandez, Diego Escobar, Jiri Silha, Klaus Merz, Stare and Chase: Optical Pointing Determination, Orbit Calculation and Satellite Laser Ranging Within a Single Pass, Proc. 7th European Conference on Space Debris, Darmstadt, Germany, 18-21 Apr. 2017.
3. J. Rodriguez, E. Cordelli, and T. Schildknecht, The new Stare & Chase Procedure at The Swiss Optical Ground Station and Geodynamics Observatory Zimmerwald, Proc. 1st NEO and Debris Detection Conference, Darmstadt, Germany, 22-24 Jan. 2019.
4. Michael A. Steindorfer, Georg Kirchner, Franz Koidl, Peiyuan Wang, Beatriz Jilete & Tim Flohrer, Daylight space debris laser ranging, Nature communications, 2020.

Patent Documents

1. Chinese patent with a publication number "CN113640787A" and titled "Constant Elevation Search Method for Space Object Capturing Using Narrow Beam Radar" on 12 Nov. 2021.

SUMMARY

In order to overcome the limitations in the prior art, the present disclosure provides a search and tracking method for full time-domain laser detection of space debris, a storage medium, and an electronic device, with main objectives of fully expanding effective detection resources of a DLR system and optimizing a phase distribution structure of DLR data, thereby greatly improving orbit determination and prediction accuracy of the space debris. Further, the improvement of orbit determination and prediction accuracy provides powerful technical support for implementation of collision avoidance and active clearance tasks of the space debris, thereby significantly improving a safety assurance capability of an in-orbit operating spacecraft.

To achieve the above objectives, the present disclosure adopts following technical solutions:

A search and tracking method for full time-domain laser detection of space debris is implemented during each transit of a space debris object relative to a DLR system, and includes:

based on a set of precision orbital parameters of an object that are determined based on data of precision radars and/or charge-coupled device (CCD) telescopes of a space monitoring network, and by taking an intermediate moment determined based on pre-obtained start and end moments of a current transit of the object as an initial time, generating a set of initial quasi-mean elements, and constructing an analytical perturbation model;

discretizing an along-track error, obtaining, in combination with the analytical perturbation model, a series of new perturbation models for describing motion of all virtual objects, and forming an apparent path cluster by different apparent paths generated from the virtual objects during the current transit;

determining a maximum detectable elevation $h_q$ and a minimum detectable elevation $h_p$ of each valid apparent path in the apparent path cluster, and then calculating search elevations of the DLR system;

for each valid apparent path in the apparent path cluster, calculating a detection elevation based on a corresponding perturbation model and in consideration of an impact of the light travel time, and obtaining, by using a dichotomous approach based on a difference between the detection elevation and a search elevation, detection feature parameters of virtual objects corresponding to all apparent paths when the virtual objects rise to the search elevation;

generating a series of sets of search-specific guidance data based on the detection feature parameters of the virtual objects, where each set of search-specific guidance data corresponds to one dwell of a laser beam emitted by the DLR system on the search elevation;

performing, by the DLR system, multi-elevation search on the object based on the search-specific guidance data; and switching to, by the DLR system, a tracking process after detecting the object, calculating an along-track error of the initial quasi-mean elements based on a few sets of detection data obtained before switching to the tracking process, to correct the along-track error of the initial quasi-mean elements, and generating tracking-specific guidance data based on a set of corrected initial quasi-mean elements to guide the DLR system to track the object.

In order to optimize the above technical solution, following specific measures are also used.

Further, after constructing the analytical perturbation model, the method further includes: calculating, in combination with the constructed analytical perturbation model, a moment of a theoretical closest approach point of the object during the current transit; and for the apparent path cluster formed by the different apparent paths generated from the virtual objects during the current transit, determining the visibility of each apparent path in the apparent path cluster based on the calculated moment of the theoretical closest approach point, removing all the invisible apparent paths and further removing all the apparent paths with an unsatisfactory detectable arc length, and taking the remaining apparent paths as valid apparent paths; and after obtaining the detection feature parameters of the virtual objects corresponding to all the valid apparent paths when the virtual objects rise to the search elevation, performing continuation processing on a value of an azimuth in the detection feature parameters to make the value of the azimuth change continuously.

Further, the constructing an analytical perturbation model specifically includes:

selecting the intermediate moment $T_0$ of the current transit of the object as a reference moment, defining an orbital along-track error of the object during the current transit as an along-track error at the reference moment, and using the first-type nonsingular orbital elements as basic variables to construct an analytical perturbation model with the reference moment as the initial time:

assuming that one set of known precision orbital parameters of the object are $t_q$, $\vec{r}_q$, $\dot{\vec{r}}_q$, and $\epsilon_a$, where $t_q$ represents the epoch moment of the one set of orbital parameters, $\vec{r}_q$ and $\dot{\vec{r}}_q$ respectively represent the position vector and the velocity vector of the object relative to an epoch geocentric inertial coordinate system, and $\epsilon_a$ represents area-mass ratio of the object, performing perturbation propagation by using a numerical method and a precision dynamic model based on the known orbital parameters $t_q$, $\vec{r}_q$, $\dot{\vec{r}}_q$, and $\epsilon_a$, performing from the moment $t_q$ to the moment $T_0$ to obtain a position vector $\vec{r}_0$ and a velocity vector $\dot{\vec{r}}_0$ of the object relative to the epoch geocentric inertial coordinate system at the moment $T_0$, performing conversion on $\vec{r}_0$ and $\dot{\vec{r}}_0$ to obtain a set of initial quasi-mean elements of the object at the moment $T_0$, and constructing, based on the initial quasi-mean elements, an analytical perturbation model with a following mathematical expression:

assuming that a, i, $\Omega$, $\xi$=e cos $\omega$, $\eta$=−e sin $\omega$, and $\lambda$=$\omega$+M are first-type nonsingular osculating orbital elements of the object, where a represents the orbital semi-major axis, i represents the orbital inclination, $\Omega$ represents the orbital right ascension of ascending node, e represents the orbital eccentricity, $\omega$ represents the orbital argument of perigee, and M represents the orbital mean anomaly, $$a(t) = \bar{a}_0 + a_s^{(1)}(t) + a_s^{(2)}(t) \quad (1)$$

$$i(t) = \bar{i}_0 + i_s^{(1)}(t) + i_s^{(2)}(t) \quad (2)$$

$$\Omega(t) = \bar{\Omega}_0 + \Omega_1(t - T_0) + \Omega_s^{(1)}(t) + \Omega_s^{(2)}(t) \quad (3)$$

$$\xi(t) = \bar{\xi}_0 \cos[\omega_1(t-T_0)] + \bar{\eta}_0 \sin[\omega_1(t-T_0)] + \xi_s^{(1)}(t) + \xi_s^{(2)}(t) \quad (4)$$

$$\eta(t) = \bar{\eta}_0 \cos[\omega_1(t-T_0)] - \bar{\xi}_0 \sin[\omega_1(t-T_0)] + \eta_s^{(1)}(t) + \eta_s^{(2)}(t) \quad (5)$$

$$\lambda(t) = \bar{\lambda}_0 + (\bar{n}_0 + \lambda_1)(t - T_0) + \lambda_s^{(1)}(t) + \lambda_s^{(2)}(t) \quad (6)$$

where in the above formulas, the left side represents osculating elements at a moment t, $\bar{a}_0$, $\bar{i}_0$, $\bar{\Omega}_0$, $\bar{\xi}_0$, $\bar{\eta}_0$, and $\bar{\lambda}_0$ represent initial quasi-mean elements at the moment $T_0$, $\bar{n}_0 = \sqrt{\mu} \bar{a}_0^{-3/2}$ represents the angular velocity of mean motion of the object, $\mu$ represents the geocentric gravitational constant, $\Omega_1$, $\omega_1$, and $\lambda_1$ represent coefficients of first-order long-term variation items of corresponding elements, $a_s^{(1)}$, $i_s^{(1)}$, $\Omega_s^{(1)}$, $\xi_s^{(1)}$, $\eta_s^{(1)}$, and $\lambda_s^{(1)}$ represent first-order short-period variation items of various elements, and $a_s^{(2)}$, $i_s^{(2)}$, $\Omega_s^{(2)}$, $\xi_s^{(2)}$, $\eta_s^{(2)}$, and $\lambda_s^{(2)}$ represent second-order short-period variation items of the elements, which are reduced-order items related to rotation of the Earth.

Further, the forming an apparent path cluster by different apparent paths generated from the virtual objects during the current transit specifically includes:

taking the along-track error of the initial quasi-mean elements as a random variable uniformly distributed within [−τ, τ], discretizing the random variable to convert a probability problem into a certainty problem, and defining a following formula:

$$\bar{\lambda}_k = \bar{\lambda}_0 + (\bar{n}_0 + \lambda_1)k\Delta\tau \quad k = l, l-1, \ldots, 0, -1, \ldots, -l+1, -l$$

where $\Delta\tau$ represents a time increment, and assuming that $\varepsilon > 0$ is a small value, a value of $\Delta\tau$ is as follows:

$$\begin{cases} \Delta\tau = \varepsilon & \tau \geq 2\varepsilon \\ \Delta\tau = \tau/2 & \tau < 2\varepsilon \end{cases}$$

l is a positive integer, and is valued as follows:

$$l = \text{int}(\tau/\Delta\tau) + 1$$

in the constructed analytical perturbation model, replacing $\bar{\lambda}_0$ in the formula (6) with $\bar{\lambda}_k$, and keeping other formulas unchanged to obtain a series of new perturbation models, which are denoted as a model $\mathcal{M}_k$, where each model $\mathcal{M}_k$ corresponds to one virtual object, and a virtual object corresponding to $\mathcal{M}_0$ is a theoretical object; and when k continuously changes from l to −l, generating, by each virtual object, a series of apparent paths to form an apparent path cluster $\{\Gamma_k|_{l,-l}\}$, where each apparent path $\Gamma_k$ is uniquely determined by the model $\mathcal{M}_k$.

Further, the obtaining detection feature parameters of virtual objects corresponding to all valid apparent paths when the virtual objects rise to the search elevation specifically includes:

for one apparent path $\Gamma_k$ in an apparent path cluster $\{\Gamma_k|_{m,n}\}$, where $\{\Gamma_k|_{m,n}\}$ represents an apparent path cluster obtained by removing all the invisible apparent paths and further removing all the apparent paths with the unsatisfactory detectable arc length from $\{\Gamma_k|_{l,-l}\}$, performing search calculation forwards from a moment $t_k$ of a closest approach point along a rising segment by using the dichotomous approach based on the model $\mathcal{M}_k$, generating, in each step, a position vector of the object relative to a True Equator and Mean Equinox of Epoch (TEMEE) coordinate system at a corresponding moment in the calculation process, calculating a corresponding detection elevation based on the obtained position vector and by considering the impact of the light travel time and an atmospheric refraction effect, determining a processing method for a next step based on a difference between the detection elevation and the search elevation, and finally obtaining detection feature parameters of the object when the object rises to the search elevation, including a detection moment, a detection range, and a detection azimuth; and repeating the above process for other apparent paths in the apparent path cluster to obtain detection feature parameters corresponding to all virtual objects.

Further, the generating a series of sets of search-specific guidance data specifically includes:

for one apparent path $\Gamma_k$ in the apparent path cluster $\{\Gamma_k|_{m,n}\}$, where a detection moment, a detection range, and a detection azimuth of a corresponding virtual object when the virtual object rises to the search elevation are respectively $t_k$, $\rho_k$, and $A'_k$, and $A'_k$ represents an azimuth after the continuation processing, taking $t_k$ as a base point, and constructing, through cubic spline interpolation based on the known parameter $\rho_k$ on the base point, an interpolation function in which a detection range $\rho$ varies with a detection moment t; and taking $A'_k$ as a base point, and constructing, through the cubic spline interpolation based on the known parameter $t_k$ on the base point, an interpolation function in which the detection moment t varies with a detection azimuth A', where the obtained interpolation functions are as follows:

$$\rho = \rho(t) \qquad (9)$$

$$t = t(A') \qquad (10)$$

a detection time scope (effective search period) when a real object rises to the search elevation is a closed interval $[t_m, t_n]$; a corresponding azimuth detection scope is a closed interval $[A_m', A_n']$, which corresponds to an azimuth interval; and when the DLR system performs search along the search elevation, a change interval for a direction of the laser beam is $[\psi_m, \psi_n]$, and a length of the interval is as follows:

$$\Delta\psi = |\psi_m - \psi_n|$$

a length of the azimuth interval of the object on the search elevation is as follows:

$$\Delta A = |A_m' - A_n'|$$

obtaining, based on a differential geometry relationship, the length of the change interval for the direction of the laser beam:

$$\Delta\psi = \cosh\Delta A$$

where h represents the search elevation of the DLR system;

evenly dividing the interval $[\psi_m, \psi_n]$ into a plurality of subintervals based on an effective diameter w of the laser beam, where a quantity of the subintervals obtained through the division is as follows:

$$N = \text{int}\left[\frac{\Delta\psi}{(1-\delta)w}\right] + 1$$

where $\delta$ represents a dimensionless scaling factor whose value is within an interval [0,1); and the azimuth interval and $[\psi_m, \psi_n]$ are divided in a same manner, such that a length of an azimuth subinterval is as follows:

$$\Delta A^* = \Delta A/N$$

defining a symbol factor:

$$\kappa = \begin{cases} 1 & A_m' < A_n' \\ -1 & A_m' > A_n' \end{cases}$$

where azimuth subintervals are sequentially $[\tilde{A}^*_v, \tilde{A}^*_{v+1}]$, where v=1, 2, ..., N, such that two endpoint values of each azimuth subinterval are obtained by recursion as follows:

$$\tilde{A}^*_1 = A_m'$$

$$\tilde{A}^*_{v+1} = \tilde{A}^*_v + \kappa\Delta A^*$$

setting $[t^*_v, t^*_{v+1}]$ to be a time subinterval corresponding to the azimuth subinterval $[\tilde{A}^*_v, \tilde{A}^*_{v+1}]$, such that two endpoint values of the time subinterval are separately calculated according to the formula (10):

$$t^*_v = t(\tilde{A}^*_v)$$

$$t^*_{v+1} = t(\tilde{A}^*_{v+1})$$

calculating a center azimuth of the azimuth subinterval $[\tilde{A}^*_v, \tilde{A}^*_{v+1}]$ according to a following formula:

$$\tilde{A}^*_{v+1/2} = (\tilde{A}^*_v + \tilde{A}^*_{v+1})/2$$

calculating, according to the formula (10), a detection moment corresponding to the center azimuth:

$$t^*_{v+1/2} = t(\tilde{A}^*_{v+1/2})$$

calculating, according to the formula (9), a detection range corresponding to the center azimuth:

$$\rho^*_{v+1/2} = \rho(\tilde{A}^*_{v+1/2})$$

restoring the center azimuth $\tilde{A}^*_{v+1/2}$, which is a result obtained after the continuation processing, to an expression before the continuation processing, where a corresponding value $A^*_{v+1/2}$ is as follows:

$$A_{\nu+1/2}^* = \begin{cases} \tilde{A}_{\nu+1/2}^* - 2\pi & \tilde{A}_{\nu+1/2}^* \geq 2\pi \\ \tilde{A}_{\nu+1/2}^* + 2\pi & \tilde{A}_{\nu+1/2}^* < 0 \\ \tilde{A}_{\nu+1/2}^* & 0 \leq \tilde{A}_{\nu+1/2}^* < 2\pi \end{cases} \quad 5$$

through the above processing process, generating a series of sets of search-specific guidance data $A^*_{\nu+1/2}$, $t^*_\nu$, $t^*_{\nu+1}$, and $\rho^*_{\nu+1/2}$, where $\nu=1, 2, \ldots, N$, $A^*_{\nu+1/2}$ represents an azimuth of the direction of the beam, $t^*_\nu$ and $t^*_{\nu+1}$ respectively represent start and end dwell moments of the beam, and $\rho^*_{\nu+1/2}$ represents a specified reference range of the object during the beam dwell.

Further, the performing, by the DLR system, multi-elevation search on the object based on the search-specific guidance data specifically includes:

generating a series of gradually increasing search elevations according to a principle that search elevations are generated in an ascending order and effective search periods of the search elevations do not intersect with each other, generating search-specific guidance data for each search elevation, and starting, by the DLR system based on the search-specific guidance data for the corresponding search elevation, search from a start search elevation and gradually switching to a highest search elevation, where the series of gradually increasing search elevations are generated according to following steps:

1) selecting a start search elevation $h^*$ between a minimum searchable elevation $h_p$ and a maximum searchable elevation $h_q$; presetting a constant $\chi$, where $\chi>0$ represents adjustment time required for the DLR system to switch from one search elevation to another search elevation; and setting $k=1$, $h_k=h^*$, and $\tilde{h}=h^*$, where $h_k$ represents a to-be-generated search elevation;

2) calculating an effective search period $[\tilde{t}_b, \tilde{t}_e]$ of the DLR system on the elevation $\tilde{h}$, and setting $h_n=\tilde{h}$ and $h_x=h_q$;

3) setting $h=(h_n+h_x)/2$, calculating an effective search period $[t_b, t_e]$ of the DLR system on the elevation $h$, and performing calculation according to $\zeta=t_b-\tilde{t}_e-\chi$;

4) if $|\zeta|<\varepsilon_t$, setting $k=k+1$, $h_k=h$, and $\tilde{h}=h$, and performing the step 2) to continue the calculation, where $\varepsilon_t$ represents a given small value relative to $\chi$; otherwise, performing next calculation;

5) setting $\Delta h=h_q-h$; and if $\zeta<0$ and $\Delta h<\varepsilon_h$, ending the calculation process, where $\varepsilon_h$ represents a given small value; otherwise, performing next calculation; and 6) if $\zeta<0$, setting $h_n=h$, and performing the step 3) to continue the calculation; otherwise, setting $h_x=h$, and performing the step 3) to continue the calculation; and obtaining the series of gradually increasing search elevations $h_k$ according to the above setting method.

Further, the procedure of calculating and correcting the along-track error of the initial quasi-mean elements based on a few sets of detection data obtained before switching to the tracking process, generating tracking-specific guidance data based on a set of corrected initial quasi-mean elements specifically includes:

setting one set of detection data obtained by the DLR system before switching to the tracking process as $\hat{t}$ and $\hat{\rho}$, which is obtained during a certain dwell of the laser beam on a certain search elevation, where $\hat{t}$ represents a detection moment, $\hat{\rho}$ represents a corresponding detection range;

1) setting an iterative initial value $\epsilon=0$ of the along-track error, and using an atmospheric correction model to calculate a ranging delay $\Delta\rho$ caused by tropospheric refraction;

2) performing calculation according to $\overline{\lambda}_\epsilon=\overline{\lambda}_0+(\overline{n}_0+\lambda_1)\epsilon$, replacing $\overline{\lambda}_0$ on the right side of the formula (6) with $\overline{\lambda}_\epsilon$ in the analytical perturbation model $\mathcal{M}_0$ to obtain a perturbation model $\mathcal{M}_\epsilon$, and obtaining a calculated value $\rho_c$ of the detection range corresponding to the detection moment $\hat{t}$ and a time change rate $\dot{\rho}_c$ of the calculated value based on the model $\mathcal{M}_\epsilon$ and in consideration of an impact of the light travel time; and 3) correcting and updating the along-track error according to $\epsilon=\epsilon+(\hat{\rho}-\Delta\rho-\rho_c)/\dot{\rho}_c$, and then performing the step 2) to perform recalculation until along-track errors before and after the update meet certain convergence accuracy, to obtain one along-track error;

for each of L sets of detection data obtained before the DLR system switches to the tracking process, where $L\geq 1$, generating one along-track error $\epsilon$ according to the above calculation process, where a finally determined along-track error is as follows:

$$\overline{\epsilon} = \sum \epsilon/L$$

correcting the along-track error of the initial quasi-mean elements based on the along-track error $\overline{\epsilon}$, and generating the tracking-specific guidance data based on the corrected initial quasi-mean elements, which specifically includes:

performing calculation according to $\overline{\lambda}_{\overline{\epsilon}}=\overline{\lambda}_0+(\overline{n}_0+\lambda_1)\overline{\epsilon}$, replacing $\overline{\lambda}_0$ on the right side of the formula (6) with $\overline{\lambda}_{\overline{\epsilon}}$ in the analytical perturbation model $\mathcal{M}_0$ to obtain a perturbation model $\mathcal{M}_{\overline{\epsilon}}$, and calculating, based on the model $\mathcal{M}_{\overline{\epsilon}}$, the impact of the light travel time, and an atmospheric refraction effect, detection azimuths, detection elevations, and detection ranges that correspond to a series of detection moments, where the detection azimuth and the detection elevation are used to determine a tracking direction of the DLR system, and the detection range is used to perform range-gate filtering on tracking echo signals of the DLR system.

The present disclosure further provides a computer-readable storage medium, where the computer-readable storage medium stores a computer program, and the computer program enables a computer to perform the above search and tracking method for full time-domain laser detection of space debris.

The present disclosure further provides an electronic device, including a memory, a processor, and a computer program stored in the memory and executable on the processor, where the processor, when executing the computer program, implements the above search and tracking method for full time-domain laser detection of space debris.

The present disclosure achieves following beneficial effects: The present disclosure adopts basic methods of celestial mechanics and astrometry, and constructs, based on precision orbital parameters of space debris, a new method for guiding a laser beam to search a debris object and switching to point tracking. Unlike various existing relevant laser detection methods of the space debris worldwide, the new method does not require initial guidance from an optical telescope with a large field of view when detecting the space debris, but can directly (blindly) detect and track the debris object using the laser beam, thereby breaking free from a time window limitation of an existing laser detection technology that relies on an optical device, and further achieving full time-domain laser detection of the space debris. Specific improvements of the present disclosure are as follows:

1. An impact of the light travel time is considered during object search and tracking. Taking a low-orbit object with a range of 3000 kilometers as an example, a change to an apparent direction of the object caused by the light travel time is about 7 arc seconds, which is at a small magnitude relative to a beam diameter of a narrow-wave radar, and is at a same magnitude as a beam diameter of a DLR system. Therefore, during object search and tracking, the impact of the light travel time can be ignored for the narrow-wave radar, but cannot be ignored for the DLR system.

2. A DLR beam is extremely narrow, and cumulative time for the object to enter the DLR beam in a constant elevation search process is very short, making it difficult to detect echo signals. The present disclosure proposes a time segment-based multi-elevation successive search scheme, which can effectively improve a detection success rate of the object.

3. For further tracking after the object is detected, an existing patented technology (see patent document 1) generates an azimuth change rate and an elevation change rate that correspond to each dwelling beam in the search process. After detecting the object in the search process, the narrow-wave radar uses an azimuth change rate and an elevation change rate of a corresponding beam for linear propagation in real time to generate orbital predictions of the object. The orbital predictions generated in this manner is characterized by poor accuracy and fast attenuation. Although the orbital predictions can guide a radar beam for effective tracking for a short period, there is a significant technical risk involved in guiding an extremely narrow DLR beam. In this regard, the present disclosure proposes a novel prediction method. After detecting the object in the search process, the DLR system uses obtained detection data of the object in real time to generate an along-track error of a set of initial quasi-mean elements, corrects theoretical orbital elements based on the along-track error, and generates orbital predictions of the object based on the corrected orbital elements and an analytical perturbation model. Because an impact of an orbital dynamics factor is considered in the prediction, accuracy of the orbital predictions are significantly improved to guide the DLR beam to perform effective tracking for a long time. High-precision range information of the object in the orbital predictions can be used to significantly improve a detection probability of the DLR system for the echo signal, making DLR detection more effective. As effective tracking time increases, a requirement for real-time performance when the DLR system switches from a searching process to a tracking process is lowered, which is also conducive to detection and processing of the echo signal after the system detects the object.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are only some rather than all of the embodiments of the present disclosure. Based on the embodiments of the present disclosure, all other embodiments obtained by a person of ordinary skill in the art without creative efforts fall within the protection scope of the present disclosure.

Embodiment 1

Figure 2:
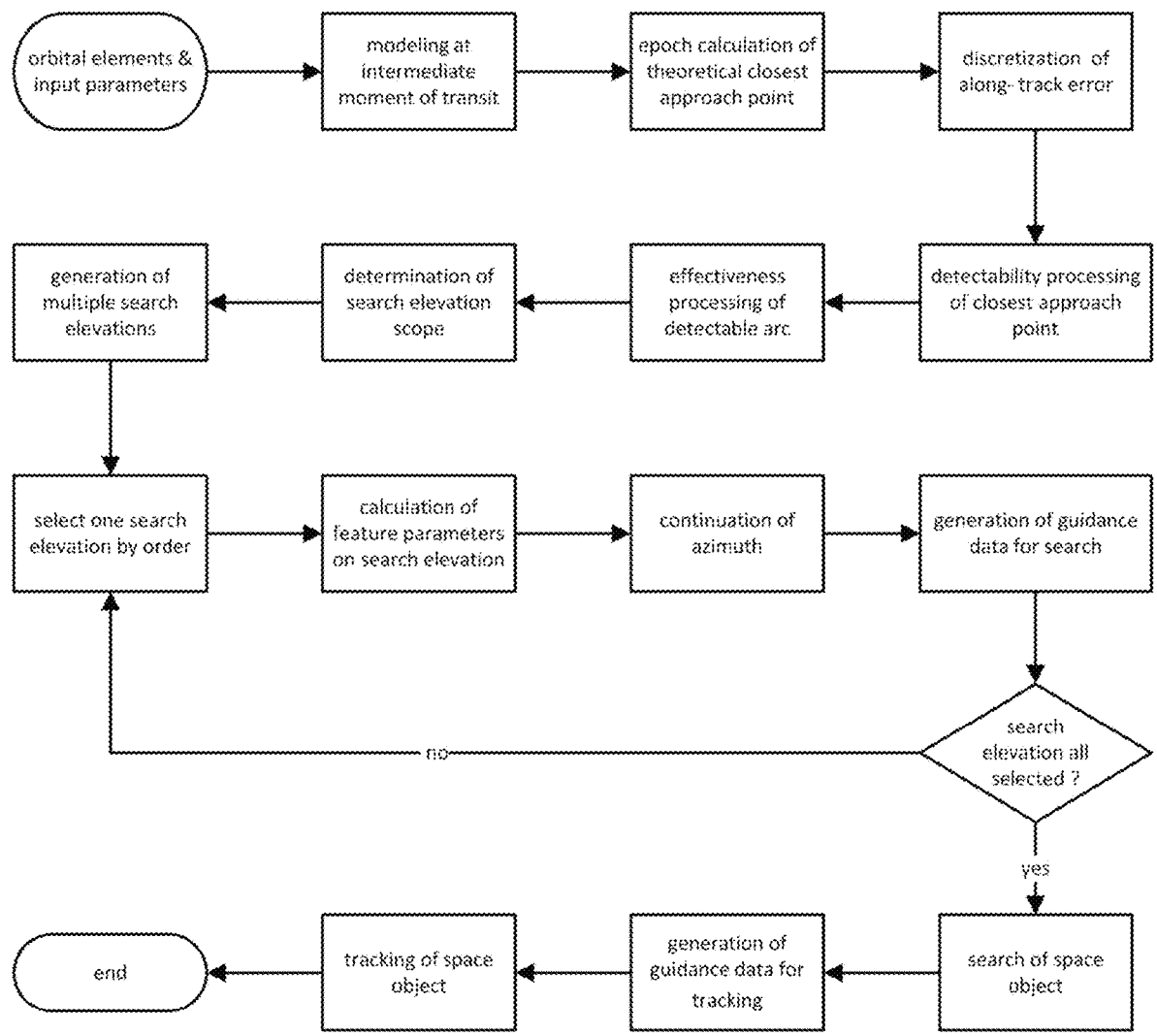
FIG. 2 is a processing flowchart of a search and tracking method for full time-domain laser detection of space debris.

As shown in FIG. 2, the present disclosure provides a search and tracking method for full time-domain laser detection of space debris, which is implemented during each transit of a debris object relative to a DLR system (only provided that constraints of a detection range and elevation are met). During implementation each time, it is required to obtain a set of latest precision orbital parameters determined based on data of precision radars and/or CCD telescopes of a space monitoring network, and start and end moments of a current transit of the object in advance. Search-specific guidance data of the DLR system is generated in advance based on the known information and in combination with estimation of a maximum along-track error of the orbital parameters of the object during the current transit. The DLR system performs constant elevation search on the object based on the search-specific guidance data, obtains a plurality of pieces of detection data of the object after detecting the object during the search, determines an along-track error of the orbital parameters of the object based on the obtained detection data, and corrects the orbital parameters of the object in real time based on the along-track error. Corrected orbital parameters are used to generate precise orbital predictions of the object to guide the DLR system to subsequently track and detect the object. The method specifically includes following steps.

Step 1: Modeling at an intermediate moment of the transit is performed.

Different types of orbital parameters can be converted to each other. It can be assumed that a set of known orbital parameters of the object are $t_q$, $\vec{r}_q$, $\dot{\vec{r}}_q$, and $\epsilon_a$, where $t_q$ represents an epoch moment of the orbital parameters, $\vec{r}_q$ and $\vec{r}_q$ respectively represent a position vector and a velocity vector of the object relative to an epoch geocentric inertial coordinate system, and $\epsilon_a$ represents an area-mass ratio of the object (which is a ballistic coefficient related to atmospheric drag perturbation). In addition, $T_b$ and $T_e$ are respectively set to start and end moments of a certain transit of the object. The intermediate moment of the current transit of the object is as follows:

$$T_0 = \frac{T_b + T_e}{2}$$

The first-type nonsingular orbital elements are used as basic variables, and an analytical perturbation model with $T_0$ as an initial time is constructed. A model construction process is as follows:

1) Perturbation propagation is performed by using a numerical method and a high-precision dynamic model based on the known orbital parameters $t_q$, $\vec{r}_q$, $\dot{\vec{r}}_q$, and $\epsilon_a$. Propagation is performed from the moment $t_q$ to the moment $T_0$ to obtain position vector $\vec{r}_0$ and velocity vector $\dot{\vec{r}}_0$ of the object relative to the epoch geocentric inertial coordinate system at the moment $T_0$. Conversion is performed on $\vec{r}_0$ and $\dot{\vec{r}}_0$ to obtain a set of initial quasi-mean elements of the object at the moment $T_0$.

2) Transit time of the object is relatively short, and there is a small perturbation change during the transit time. Therefore, the present disclosure constructs a simplified analytical perturbation model based on the initial quasi-mean elements at the moment $T_0$, which is used to describe orbital motion of the object during the current transit. The model only considers the first-order long-term items and the first-order short-period items of an orbital perturbation change, and a small quantity of second-order short-period items with a large amplitude due to rotation of the Earth.

A specific mathematical expression of the constructed model is as follows:

It is assumed that $a$, $i$, $\Omega$, $\xi = e \cos \omega$, $\eta = -e \sin \omega$, and $\lambda = \omega + M$ are first-type nonsingular osculating orbital elements of the object, where $a$ represents the orbital semi-major axis, $i$ represents the orbital inclination, $\Omega$ represents the orbital right ascension of ascending node, $e$ represents the orbital eccentricity, $\omega$ represents the orbital argument of perigee, and $M$ represents the orbital mean anomaly. Therefore, following formulas are obtained:

$$a(t) = \bar{a}_0 + a_s^{(1)}(t) + a_s^{(2)}(t) \tag{1}$$

$$i(t) = \bar{i}_0 + i_s^{(1)}(t) + i_s^{(2)}(t) \tag{2}$$

$$\Omega(t) = \bar{\Omega}_0 + \Omega_1(t - T_0) + \Omega_s^{(1)}(t) + \Omega_s^{(2)}(t) \tag{3}$$

$$\xi(t) = \bar{\xi}_0 \cos[\omega_1(t - T_0)] + \bar{\eta}_0 \sin[\omega_1(t - T_0)] + \xi_s^{(1)}(t) + \xi_s^{(2)}(t) \tag{4}$$

$$\eta(t) = \bar{\eta}_0 \cos[\omega_1(t - T_0)] - \bar{\xi}_0 \sin[\omega_1(t - T_0)] + \eta_s^{(1)}(t) + \eta_s^{(2)}(t) \tag{5}$$

$$\lambda(t) = \bar{\lambda}_0 + (\bar{n}_0 + \lambda_1)(t - T_0) + \lambda_s^{(1)}(t) + \lambda_s^{(2)}(t) \tag{6}$$

In the above formulas, the left side represents osculating elements at moment $t$, $\bar{a}_0$, $\bar{i}_0$, $\bar{\Omega}_0$, $\bar{\xi}_0$, $\bar{\eta}_0$, and $\bar{\lambda}_0$ represent initial quasi-mean elements at the moment $T_0$, $\bar{n}_0 = \sqrt{\mu} \bar{a}_0^{-3/2}$ represents an angular velocity of mean motion of the object, $\mu$ represents the geocentric gravitational constant, $\Omega_1$, $\omega_1$, and $\lambda_1$ represent coefficients of first-order long-term perturbation items of corresponding elements, $a_s^{(1)}$, $i_s^{(1)}$, $\Omega_s^{(1)}$, $\xi_s^{(1)}$, $\eta_s^{(1)}$, and $\lambda_s^{(1)}$ represent first-order short-period perturbation items of various elements, and $a_s^{(2)}$, $i_s^{(2)}$, $\Omega_s^{(2)}$, $\xi_s^{(2)}$, $\eta_s^{(2)}$, and $\lambda_s^{(2)}$ represent second-order short-period perturbation items of the elements, which are reduced-order items related to the rotation of the Earth.

Step 2: A moment of a theoretical closest approach point is calculated.

A closest approach point of the object during the current transit corresponds to a certain point on the debris orbit. When the object reaches the point, the object has a maximum apparent elevation. The analytical perturbation model constructed in the step 1 determines a theoretical debris orbit, which corresponds to one theoretical closest approach point. The moment of the theoretical closest approach point is solved according to following two steps:

In a first step, moment $t_0^*$ of an approximate closest approach point is solved according to a following formula:

$$t_0^* = T_0 + \frac{\lambda_s - \lambda_0}{\dot{\lambda} - \dot{u}_s}$$

In the above formula, $\lambda_0$ represents a value of $\lambda(t)$ at the moment $T_0$, which is the mean argument of latitude of the object at the moment $T_0$ and can be calculated according to the formula (6); $\dot{\lambda} = \bar{n}_0 + \lambda_1$ represents a long-term change rate of $\lambda(t)$; $u_s$ and $\lambda_s$ respectively represent the true argument of latitude and the mean argument of latitude of a projection of an observation station on the orbit at the moment $T_0$; and $\dot{u}_s$ represents a time change rate of $u_s$.

In a second step, the mean argument of latitude $\lambda_0^*$ of the object at the moment $t_0^*$ is first calculated according to the formula (6), and the true argument of latitude $u_0^*$ of the object at the moment $t_0^*$ is calculated based on an elliptical motion relationship and $\lambda_0^*$. Then, $u_0^*$ is taken as an initial value to perform iterative solving to obtain the true argument of latitude $\tilde{u}_0$ corresponding to moment $\tilde{t}_0$ of an accurate closest approach point. An equation for the iterative solving is as follows:

$$\sin(\tilde{u}_0 - u_0^*) = \frac{(\tilde{\xi}_0 \sin \tilde{u}_0 + \tilde{\eta}_0 \cos \tilde{u}_0) \sin^2 \theta}{(1 - \tilde{\eta}_0 \sin \tilde{u}_0 + \tilde{\xi}_0 \cos \tilde{u}_0) \cos \theta_0 (r/R - \cos \theta)}$$

In the above equation, $\tilde{\xi}_0$ and $\tilde{\eta}_0$ respectively represent values of $\xi(t)$ and $\eta(t)$ at the moment $\tilde{t}_0$, which can be respectively calculated according to the formulas (4) and (5); $\theta$ represents a geocentric angle of the object and the observation station at the moment $\tilde{t}_0$; $\theta_0$ represents a latitude of the observation station with reference to orbit plane at the moment $t_0^*$; $r$ represents a geocentric distance of the object at the moment $\tilde{t}_0$; and $R$ represents a geocentric distance of the observation station. Finally, the mean argument of latitude $\tilde{\lambda}_0$ of the object at the moment $\tilde{t}_0$ is calculated based on the elliptical motion relationship and $\tilde{u}_0$, and the moment of the accurate closest approach point is calculated according to a following formula:

$$\tilde{t}_0 = t_0^* + \frac{\tilde{\lambda}_0 - \lambda_0^*}{\dot{\lambda}}$$

Step 3: The along-track error is discretized and an apparent path cluster is generated.

Based on accuracy of the known orbital parameters $t_q$, $\vec{r}_q$, $\dot{\vec{r}}_q$, $\epsilon_a$, and prediction duration, a maximum along-track error of the initial quasi-mean elements at the moment $T_0$ is estimated. A corresponding estimated value is a time quantum whose absolute value is set to $\tau$. The along-track error of the initial quasi-mean elements is considered as a random variable uniformly distributed within closed interval $[-\tau, \tau]$, and the random variable is discretized to convert a probability problem into a certainty problem. Therefore, a following formula is defined:

$$\overline{\lambda}_k = \overline{\lambda}_0 + (\overline{n}_0 + \lambda_1)k\Delta\tau \quad k = l, l-1, \ldots, 0, -1, \ldots, -l+1, -l$$

In the above formula, $\Delta\tau$ represents a time increment, and assuming that $\varepsilon > 0$ is a small value, a value of $\Delta\tau$ is as follows:

$$\begin{cases} \Delta\tau = \varepsilon & \tau \geq 2\varepsilon \\ \Delta\tau = \tau/2 & \tau < 2\varepsilon \end{cases}$$

l is a positive integer, and is valued as follows:

$$l = \text{int}(\tau/\Delta\tau) + 1$$

In the constructed analytical perturbation model, $\overline{\lambda}_0$ on the right side of the formula (6) is replaced with $\overline{\lambda}_k$, and other formulas keep unchanged to obtain a new perturbation model, which is denoted as model $\mathcal{M}_k$. Each model $\mathcal{M}_k$ determines one virtual object, and a virtual object corresponding to $\mathcal{M}_0$ is a theoretical object. Each virtual object moves along the same theoretical orbit, with only different along-track positions. Due to the rotation of the Earth, from a ground station, virtual objects at different positions generate different apparent motion tracks during the current transit of the object. When k continuously changes from l to −l, the corresponding virtual object generates a series of apparent paths to form an apparent path cluster $\{\Gamma_k|_{l,-l}\}$, where each apparent path $\Gamma_k$ is uniquely determined by the model $\mathcal{M}_k$.

Step 4: Detectability of the closest approach point is constrained.

The closest approach point is a point on the apparent path with the best detection condition for the DLR system. If the closest approach point is not detectable, the entire apparent path cannot be detected, and such an apparent path cannot be considered. Therefore, it is necessary to confirm detectability of each apparent path in the apparent path cluster $\{\Gamma_k|_{l,-l}\}$ and remove all undetectable apparent paths.

Firstly, a moment of a closest approach point of each apparent path is calculated as follows:

1) Theoretical apparent path $\Gamma_0$ is considered, and its detectability has been confirmed in prediction calculation on the transit. A moment of a corresponding closest approach point has been calculated in the step 2.
2) Two adjacent apparent paths $\Gamma_k$ and $\Gamma_{k+1}$ are considered, a moment of an accurate closest approach point of $\Gamma_k$ is used as a moment of an approximate closest approach point of $\Gamma_{k+1}$, and a second step of the step 2 is directly preformed to enter a solving process. In the solving process, model $\mathcal{M}_{k+1}$ is used for relevant calculation to obtain a moment of an accurate closest approach point of $\Gamma_{k+1}$. k is considered to continuously change from 0 to l−1. The above processing method is used to gradually obtain moments of closest approach points of apparent paths $\Gamma_1$, $\Gamma_2$, and . . . , $\Gamma_l$.
3) Two adjacent apparent paths $\Gamma_k$ and $\Gamma_{k-1}$ are considered, the moment of the accurate closest approach point of $\Gamma_k$ is used as a moment of an approximate closest approach point of $\Gamma_{k-1}$, and the second step of the step 2 is directly preformed to enter the solving process. In the solving process, model $\mathcal{M}_{k-1}$ is used for relevant calculation to obtain a moment of an accurate closest approach point of $\Gamma_{k-1}$. k is considered to continuously change from 0 to −l+1. The above processing method is used to gradually obtain moments of closest approach points of apparent paths $\Gamma_{-1}$, $\Gamma_{-2}$, and . . . , $\Gamma_{-l}$.

So far, moments of closest approach points of all apparent paths are calculated.

For one apparent path $\Gamma_k$ in the apparent path cluster $\{\Gamma_k|_{l,-l}\}$, moment $\tilde{t}_k$ of a closest approach point of the one apparent path is substituted into the model $\mathcal{M}_k$ to obtain osculating elements at the moment of the closest approach point. A range and an elevation of the closest approach point are calculated based on the osculating elements, and are compared with detection constraints of the DLR system to confirm detectability of one apparent path. The detection constraints of the DLR system include thresholds of the detection range and elevation. After detectability of each apparent path in the apparent path cluster $\{\Gamma_k|_{l,-l}\}$ is confirmed, all the undetectable apparent paths are removed, and the remaining apparent paths are still consecutive, forming apparent path cluster $\{\Gamma_k|_{i,j}\}$, where $i \geq 0 \geq j$.

Step 5: Detection effectiveness is constrained.

A detectable arc length of the DLR system is a necessary condition for the DLR system to obtain high-quality detection data. Therefore, it is necessary to further screen each apparent path in the apparent path cluster $\{\Gamma_k|_{i,j}\}$ and remove all apparent paths with unsatisfactory detectable arc lengths to effectively obtain DLR data and improve detection efficiency of the system.

Taking the moment of the closest approach point as a boundary, apparent motion of the object is a process of first increasing the elevation and then decreasing the elevation. An apparent path segment before the moment of the closest approach point is an ascending segment, and an apparent path segment after the moment of the closest approach point is a descending segment. In order to ensure that the DLR system can still have a long detectable arc segment after searching and discovering the object, the present disclosure is intended to search an object in the ascending segment, and require that detectable duration of an object in the descending segment should not be less than a given threshold. A specific processing process is as follows:

For one apparent path $\Gamma_k$ in the apparent path cluster $\{\Gamma_k|_{i,j}\}$, based on the model $\mathcal{M}_k$ and in combination with the detection constraints of the DLR system, search calculation is carried out backwards along the descending segment from the moment $\tilde{t}_k$ of the closest approach point at an appropriate step until a moment specified by a threshold. If an undetectable target point is found during the search, the one apparent path is removed from the apparent path cluster. The above processing process is repeated for other apparent paths in the apparent path cluster, such that all the apparent paths with the unsatisfactory detectable arc lengths are removed. If there is no remaining apparent path, it indicates that the DLR system cannot obtain valid detection data during the current transit of the object, and subsequent processing is terminated. Otherwise, the remaining apparent paths are still consecutive, forming apparent path cluster $\{\Gamma_k|_{m,n}\}$, where m≥n.

Step 6: A range of a search elevation is determined.

For one apparent path $\Gamma_k$ in the apparent path cluster $\{\Gamma_k|_{m,n}\}$, a maximum detectable elevation of the one apparent path is an elevation of a corresponding closest approach point, which has been given in the step 4. A minimum detectable elevation of the one apparent path needs to be calculated. Search calculation can be performed forwards along the ascending segment from the moment $\bar{t}_k$ of the closest approach point at an appropriate initial step by using a dichotomous approach based on the model $\mathcal{M}_k$. During the calculation, in each step, detectability can be determined based on the detection constraints of the DLR system to determine a processing method for a next step. Finally, a minimum detectable elevation meeting a certain accuracy requirement is given. The above processing process is repeated for other apparent paths in the apparent path cluster, such that maximum detectable elevations and minimum detectable elevations of all apparent paths are obtained.

A minimum value is taken from the maximum detectable elevations of all the apparent paths, and set to $h_q$. A maximum value is taken from the minimum detectable elevations of all the apparent paths, and set to $h_p$. Then an elevation scope suitable for the DLR system to perform constant elevation search is determined based on closed interval [$h_p$, $h_q$], where $h_q$≥$h_p$. An available search elevation (ASE) of the DLR system can be obtained according to a following formula:

$$h = h_p + \beta(h_q - h_p)$$

In the above formula, β represents a scaling factor for taking a value in closed interval [0, 1].

Step 7: Feature parameters on the search elevation are calculated.

A space object travels to a target point along its orbit at moment t'. A position vector of the target point relative to the geocentric inertial coordinate system is $\vec{r}$. The laser beam emitted by the DLR system at the moment t hits the target point, where t represents the detection moment of the DLR system. The corresponding detection distance, azimuth, and elevation of the detection moment can be calculated based on position vector $\vec{r}_b$ of the target point relative to the Earth-fixed coordinate system and coordinates of the ground station. $\vec{r}_b$ can be obtained through following coordinate conversion:

$$\vec{r}_b = G(t)\vec{r} \tag{7}$$

As described above, G represents a conversion matrix from the geocentric inertial coordinate system to the Earth-fixed coordinate system, which is a time function. Due to a limited speed of light, a light wave requires a propagation time from the ground station to the target point, which is referred to as the light travel time. If an impact of the light travel time is ignored, it can be set that t=t'. Then $\vec{r}_b$ can be directly obtained according to the formula (7), and then a detection range, azimuth, and elevation of the target point can be given. If the impact of the light travel time is considered, a following formula is obtained:

$$t = t' - \rho/c \tag{8}$$

In the above formula, ρ represents the detection range of the target point, c represents the speed of light, and t and $\vec{r}_b$ are interdependent, which are not known and can only be iteratively processed. During the iteration, initial condition t=t' is set, $\vec{r}_b$ is calculated according to the formula (7), and a new value of t is obtained according to the formula (8) until t meets specified convergence accuracy. Finally, an accurate detection moment and its corresponding detection range, azimuth, and elevation are given.

For one apparent path $\Gamma_k$ in the apparent path cluster $\{\Gamma_k|_{m,n}\}$, search calculation is performed forwards along the ascending segment from the moment $\bar{t}_k$ of the closest approach point at an appropriate initial step by using the dichotomous approach based on the model $\mathcal{M}_k$. During the calculation, in each step, a position vector of the object relative to a TEMEE coordinate system at the corresponding moment is generated first. Then, a corresponding detection elevation is calculated based on the obtained position vector and by considering the impact of the light travel time and an atmospheric refraction effect, a processing method for a next step is determined based on a difference between the detection elevation and the search elevation, and finally detection feature parameters meeting a certain accuracy requirement are given, including a detection moment, range, and azimuth when the object rises to the search elevation. The above processing process is repeated for other apparent paths in the apparent path cluster, such that detection feature parameters corresponding to all virtual objects are obtained.

Step 8: Continuation processing is performed on the azimuth.

For one apparent path $\Gamma_k$ in the apparent path cluster $\{\Gamma_k|_{m,n}\}$, an azimuth of a corresponding virtual object when the virtual object rises to the search elevation is $A_k$, where a value of $A_k$ is within interval [0,2π). The value of $A_k$ is redefined, and a defined value of $A_k$ is $A'_k$.

k is considered to continuously change from m to n, and $A'_m = A_m$ and $\Delta A_k = A_k - A_{k+1}$ are set, where m−1≥k≥n. Subsequent $A'_k$ is calculated based on following three independent cases:

1) If there is integer p that meets m−1≥p≥n, and $\Delta A_p < -\pi$, a following formula is obtained:

$$A'_k = \begin{cases} A_k & k > p \\ A_k + 2\pi & k \leq p \end{cases}$$

2) If there is integer p that meets m−1≥p≥n, and $\Delta A_p > \pi$, a following formula is obtained:

$$A'_k = \begin{cases} A_k & k > p \\ A_k - 2\pi & k \leq p \end{cases}$$

3) If there is no integer p meeting the above two cases, a following formula is obtained:

$$A'_k = A_k \quad m - 1 \geq k \geq n$$

A value of each $A'_k$ obtained above is no longer limited to the interval $[0,2\lambda)$, but is consecutive while varying with k. $A'_k$ and $A_k$ correspond to a same physical orientation, and $A'_k$ can be used to replace $A_k$ as the azimuth.

Step 9: The search-specific guidance data is generated.

For one apparent path $\Gamma_k$ in the apparent path cluster $\{\Gamma_k|_{m,n}\}$, a detection moment, range, and azimuth when a corresponding virtual object rises to the search elevation are respectively set to $t_k$, $\rho_k$, and $A'_k$, where $A'_k$ represents an azimuth after the continuation processing. k is considered to continuously change from m to n, and $t_k$ strictly monotonically increases with k. Therefore, $t_k$ can be used as a base point. An interpolation function in which the detection range $\rho$ varies with the detection moment t is constructed through cubic spline interpolation based on the known parameter $\rho_k$ on the base point. $A'_k$ strictly monotonically increases or decreases with k. Therefore, $A'_k$ can be used as a base point, and an interpolation function in which the detection moment t varies with the detection azimuth A' is constructed through the cubic spline interpolation based on the known parameter $t_k$ on the base point. The obtained interpolation functions are as follows:

$$\rho = \rho(t) \quad (9)$$

$$t = t(A') \quad (10)$$

A detection time scope when a real object rises to the search elevation is closed interval $[t_m, t_n]$, and a corresponding azimuth detection scope is closed interval $[A'_m, A'_n]$, which corresponds to an azimuth interval. When the DLR system performs search along the search elevation, there is also a change interval for a direction of the laser beam, which is denoted as $[\psi_m, \psi_n]$, and a length of the interval is as follows:

$$\Delta\psi = |\psi_m - \psi_n|$$

A length of the azimuth interval of the object on the search elevation is as follows:

$$\Delta A = |A'_m - A'_n|$$

Figure 1:
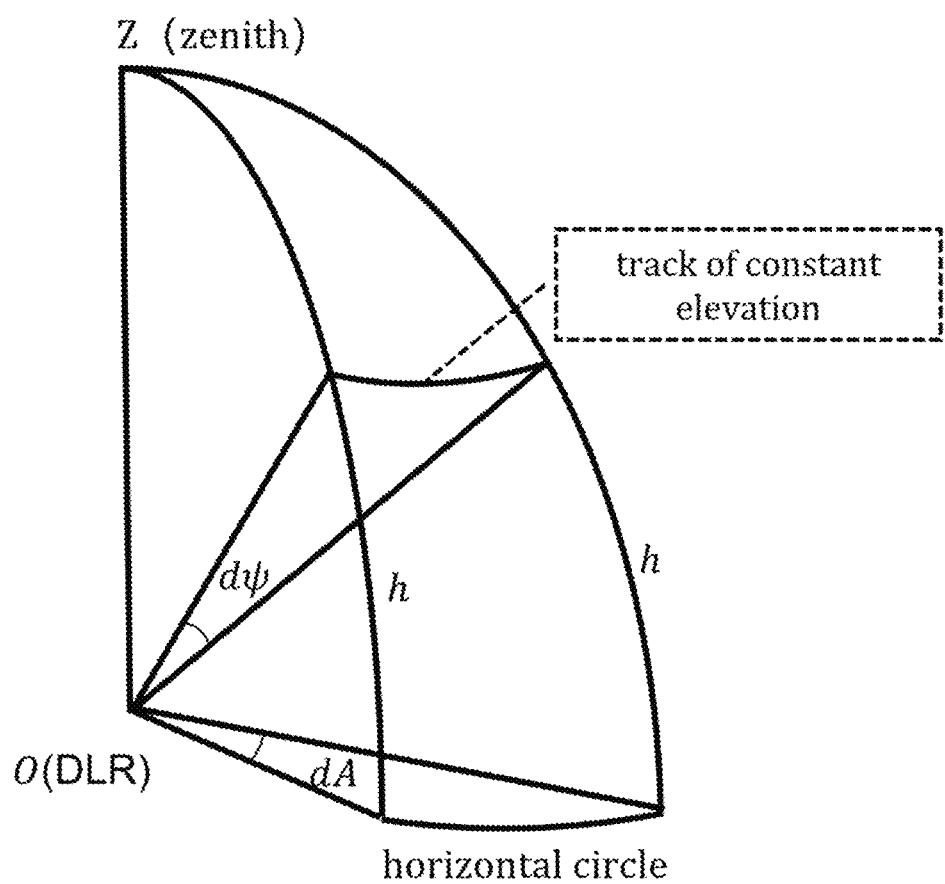
FIG. 1 shows a geometric relationship indicating that a beam pointing angle differentially varies with an azimuth.

As shown in FIG. 1, a following differential geometric relationship is used:

$$d\psi = \cosh dA$$

$$\int_{\psi_m}^{\psi_n} d\psi = \int_{A'_m}^{A'_n} \cosh dA$$

The length of the change interval for the direction of the laser beam can be obtained:

$$\Delta\psi = \cosh \Delta A$$

An effective diameter of the laser beam is set to w. The interval $[\psi_m, \psi_n]$ is evenly divided into a plurality of subintervals. A quantity of the subintervals obtained through the division is as follows:

$$N = \text{int}\left[\frac{\Delta\psi}{(1-\delta)w}\right] + 1$$

In the above formula, $\delta$ represents a dimensionless scaling factor that takes a value within interval $[0,1)$, and a length of the subinterval $[\psi_m, \psi_n]$ obtained through the division based on N does not exceed the effective diameter of the laser beam. The azimuth interval and $[\psi_m, \psi_n]$ are divided in a same manner, such that a length of an azimuth subinterval is as follows:

$$\Delta A^* = \Delta A / N$$

A symbol factor is defined:

$$\kappa = \begin{cases} 1 & A'_m < A'_n \\ -1 & A'_m > A'_n \end{cases}$$

Assuming that azimuth subintervals are sequentially $[\tilde{A}^*_\nu, \tilde{A}^*_{\nu+1}]$, where $\nu=1, 2, \ldots, N$, two endpoint values of each azimuth subinterval are obtained by recursion as follows:

$$\tilde{A}^*_1 = A'_m$$

$$\tilde{A}^*_{\nu+1} = \tilde{A}^*_\nu + \kappa \Delta A^*$$

$[t^*_\nu, t^*_{\nu+1}]$ is set to be a time subinterval corresponding to the azimuth subinterval $[\tilde{A}^*_\nu, \tilde{A}^*_{\nu+1}]$, such that two endpoint values of the time subinterval are separately calculated according to the formula (10):

$$t^*_\nu = t(\tilde{A}^*_\nu)$$

$$t^*_{\nu+1} = t(\tilde{A}^*_{\nu+1})$$

A center azimuth of the azimuth subinterval $[\tilde{A}^*_\nu, \tilde{A}^*_{\nu+1}]$ is calculated according to a following formula:

$$\tilde{A}^*_{\nu+1/2} = (\tilde{A}^*_\nu + \tilde{A}^*_{\nu+1})/2$$

A detection moment corresponding to the center azimuth is calculated according to the formula (10):

$$\tau^*_{\nu+1/2} = \tau(\tilde{A}^*_{\nu+1/2})$$

A detection range corresponding to the center azimuth is calculated according to the formula (9):

$$\rho^*_{\nu+1/2} = \rho(t^*_{\nu+1/2})$$

The center azimuth $\tilde{A}^*_{\nu+1/2}$ is actually a result obtained after the continuation processing, and is restored to a common expressive method. Assuming that a corresponding value is $\tilde{A}^*_{v+1/2}$, a following formula is obtained:

$$A^*_{v+1/2} = \begin{cases} \tilde{A}^*_{v+1/2} - 2\pi & \tilde{A}^*_{v+1/2} \geq 2\pi \\ \tilde{A}^*_{v+1/2} + 2\pi & \tilde{A}^*_{v+1/2} < 0 \\ \tilde{A}^*_{v+1/2} & 0 \leq \tilde{A}^*_{v+1/2} < 2\pi \end{cases} \quad 5$$

Through the above processing process, a series of sets of search-specific guidance data $A^*_{v+1/2}$, $t^*_v$, $t^*_{v+1}$, and $\rho^*_{v+1/2}$ is generated, where $v=1, 2, \ldots, N$. Each set of guidance data corresponds to one dwell of the laser beam on the search elevation, where $A^*_{v+1/2}$ represents an azimuth of the direction of the beam, $t^*_v$ and $t^*_{v+1}$ respectively represent start and end dwell moments of the beam, and $\rho^*_{v+1/2}$ represents a specified reference range of the object during the beam dwell, which is used to perform range-gate filtering on echo signals. When each set of guidance data changes from $v=1$ to $v=N$, the corresponding beam is considered to dwell in different orientations on the search elevation in chronological order, forming a method and process of the constant elevation search by the DLR system. A start time of a first dwell of the beam is $t^*_1=t_m$. For each of other beams, a start time of a current dwell of the beam is an end time of a previous dwell of the beam. An end time of a last dwell of the beam is $t^*_{N+1}=t_n$, and $[t_m, t_n]$ is an effective search period of the DLR system on the search elevation.

The above is only a general processing process, and there is a special case that needs to be explained to ensure preciseness and completeness of the technical solution:

After the processing in the step 5, if there is only one apparent path in the apparent path cluster $\{\Gamma_k|_{m,n}\}$, a detection moment when a virtual object on the one apparent path rises to the search elevation is taken as a center moment, and the center moment is separately subtracted and added by $\Delta \tau/2$ as the start and end dwell moments of the beam. There is a total of one dwell for the beam, and the azimuth of the direction of the beam and the reference range set for the object during the beam dwell are taken as corresponding detection feature parameters of the virtual object on the one apparent path.

Step 10: A plurality of search elevations are set.

Multi-elevation search is an effective means to improve an object detection success rate of the DLR system. Based on a motion characteristic of the object in the ascending segment, the DLR system should carry out the multi-elevation search gradually from a low elevation to a high elevation. In addition, effective search periods for the plurality of elevations should not intersect with each other to avoid a time conflict between different search processes. Following the above consideration, a method for setting the plurality of search elevations is given as follows:

1) Start search elevation $h^*$ between minimum searchable elevation $h_p$ and maximum searchable elevation $h_q$ is selected based on a technical condition of the DLR system, and generally, $h^* \geq 15°$. In addition, constant $\chi$ is preset, where $\chi>0$ represents adjustment time required for the DLR system to switch from one search elevation to another search elevation. It is set that $k=1$, $h_k=h^*$, and $\tilde{h}=h^*$.
2) Effective search period $[\tilde{t}_b, \tilde{t}_e]$ of the DLR system on the elevation $\tilde{h}$ is obtained through relevant calculation in the step 7, and $h_n=\tilde{h}$ and $h_x=h_q$ are set.
3) It is set that $h=(h_n+h_x)/2$, effective search period $[t_b, t_e]$ of the DLR system on the elevation $h$ is calculated through relevant calculation in the step 7, and calculation is performed according to $\zeta=t_b-\tilde{t}_e-\chi$.
4) If $|\zeta|<\varepsilon_t$, $k=k+1$, $h_k=h$, and $\tilde{h}=h$ are set, and the step 2) is performed to continue the calculation, where $\varepsilon_t$ represents a given small value relative to $\chi$; otherwise, next calculation is performed.
5) It is set that $\Delta h=h_q-h$. If $\zeta<0$ and $\Delta h<\varepsilon_h$, the calculation process ends, where $\varepsilon_h$ represents a given small value; otherwise, next calculation is performed.
6) If $\zeta<0$, $h_n=h$ is set, and the step 3) is performed to continue the calculation; otherwise, $h_x=h$ is set, and the step 3) is performed to continue the calculation.

By using the above setting method, a series of gradually increasing search elevations $h_k$ are obtained, where $k \geq 1$, and a maximum quantity of effective search elevations are set. Search-specific guidance data for each elevation can be generated by repeatedly performing the steps 7, 8, and 9. Based on search-specific guidance data for a corresponding elevation, the DLR system starts search on a start elevation and can gradually switch to perform search on a higher elevation, until search on a highest elevation is completed.

Step 11: Tracking-specific guidance data is generated.

After discovering the object for the first time during the search, the DLR system can switch to a tracking process at any time. It is assumed that the DLR system has obtained a few sets of detection data before switching to the tracking process, and one set of detection data is $\hat{t}$ and $\hat{\rho}$, which is obtained during a certain dwell of the laser beam on a certain search elevation, where $\hat{t}$ represents the detection moment, and $\hat{\rho}$ represents the corresponding detection range. In order to generate high-precision guidance data suitable for DLR tracking, it is necessary to correct the along-track error for the initial quasi-mean elements. One along-track error $\epsilon$ can be obtained through iterative calculation based on the one set of detection data, and a calculation process is as follows:

1) Iterative initial value $\epsilon=0$ is set, and an appropriate atmospheric correction model is used to calculate ranging delay $\Delta \rho$ caused by tropospheric refraction.
2) Calculation is performed according to $\overline{\lambda}_\epsilon = \overline{\lambda}_0 + (\overline{n}_0 + \lambda_1)\epsilon$, $\overline{\lambda}_0$ on the right side of the formula (6) is replaced with $\overline{\lambda}_\epsilon$ and other formulas keep unchanged in the analytical perturbation model $\mathcal{M}_0$ to obtain perturbation model $\mathcal{M}_\epsilon$, and calculated value $\rho_c$ of the detection range corresponding to the detection moment $\hat{t}$ and time change rate $\dot{\rho}_c$ of the calculated value are obtained based on the model $\mathcal{M}_\epsilon$ and in consideration of an impact of the light travel time.
3) The along-track error is corrected and updated according to $\epsilon=\epsilon+(\hat{\rho}-\Delta\rho-\rho_c)/\dot{\rho}_c$, and then the step 2) is performed for recalculation until along-track errors before and after the update meet certain convergence accuracy, to obtain one along-track error.

Based on each of L sets of detection data obtained before the DLR system switches to the tracking process, where $L \geq 1$, one along-track error $\epsilon$ is generated according to the above calculation process. A finally determined along-track error is as follows:

$$\overline{\epsilon} = \sum \epsilon/L$$

The along-track error is corrected for the initial quasi-mean elements based on error $\overline{\epsilon}$, and the tracking-specific guidance data is generated based on a set of corrected initial quasi-mean elements. A specific method includes: performing calculation according to $\overline{\lambda}_\epsilon = \overline{\lambda}_0 + (\overline{n}_0 + \lambda_1)\overline{\epsilon}$, replacing $\overline{\lambda}_0$ on the right side of the formula (6) with $\bar{\lambda}_{\bar{\epsilon}}$ and keeping other formulas unchanged in the analytical perturbation model $\mathcal{M}_0$ to obtain perturbation model $\mathcal{M}_{\bar{\epsilon}}$, and calculating, based on the model $\mathcal{M}_{\bar{\epsilon}}$, the impact of the light travel time, and the atmospheric refraction effect, detection azimuths, detection elevations, and detection ranges that correspond to a series of detection moments. The detection azimuth and the detection elevation are used to determine a tracking direction of the DLR system, and the detection range is used to perform range-gate filtering on tracking echo signals of the DLR system.

The present disclosure always implements the processing for the along-track error. The estimated maximum along-track error is discretized to form a constant elevation search process of the DLR system. The DLR system searches and discovers the object during the search, and the detection data obtained by the system is used as posterior information, to determine the along-track error in real time. The along-track error is corrected for theoretical orbital elements to generate high-precision tracking-specific guidance data.

Embodiment 2

This embodiment selects AJISAI (NASA catalog number 16908) as an experimental object, which has an orbital height of 1,400 kilometers and is a laser calibration satellite. A high-precision CPF ephemeris of the object can be used as an experimental comparison standard. The experiment selects a hypothetical DLR site in China and assumes that an effective beam diameter of a DLR system is 20 arc seconds. When the object enters an effective DLR beam, an included angle between a beam direction and a direction of the object should be less than 10 arc seconds. In the experiment, one set of orbital parameters of the object relative to the J2000 geocentric inertial coordinate system is generated based on detection data obtained by a precision tracking radar in China, namely $t_q$, $\vec{r}_q$, $\dot{\vec{r}}_q$, and $\epsilon_a$, as shown in Table 1:

TABLE 1

One set of orbital parameters of the AJISAI relative to the J2000 geocentric inertial coordinate system

| $t_q$(Beijing time) | | | Feb. 25, 2021 07:50:56.091 | |
|---|---|---|---|---|
| $\vec{r}_q$ (m) | $x_q$ | 1059237.065 | $\dot{\vec{r}}_q$ (m/s) | $\dot{x}_q$ -6942.578 |
| | $y_q$ | 4948397.066 | | $\dot{y}_q$ 1557.054 |
| | $z_q$ | 6023858.754 | | $\dot{z}_q$ -55.253 |
| $\epsilon_a$(m²/kg) | | | 0.00010 | |

The experiment is based on the one set of orbital parameters and specified detection constraints of the DLR system (a maximum detection range is 5,000 kilometers, and a minimum detection elevation is 5°), and a certain transit of the object is determined through high-precision perturbation calculation. The transit is a transit after 19 days starting from the epoch moment of the orbital parameters of the object. During the transit, search, and tracking experiments of the object are carried out.

1) Intermediate moment $T_0$ of the current transit is calculated first. In addition, perturbation propagation is performed by using a numerical method and a high-precision dynamic model based on the known orbital parameters $t_q$, $\vec{r}_q$, $\dot{\vec{r}}_q$, and $\epsilon_a$. Propagation is performed from the moment $t_q$ to the moment $T_0$ to obtain position vector $\vec{r}_0$ and velocity vector $\dot{\vec{r}}_0$ of the object relative to the J2000 geocentric inertial coordinate system at the moment $T_0$. Further, $\vec{r}_0$ and $\dot{\vec{r}}_0$ are converted into a set of initial quasi-mean elements of the object at the moment $T_0$, as shown in Table 2.

TABLE 2

Initial quasi-mean elements of AJISAI at the intermediate moment during the transit 10:15:25.450

| $T_0$ (Beijing time) | Mar. 16, 2021 10:15:25.450 | | |
|---|---|---|---|
| $\bar{a}_0$(m) | 7866388.521 | $\bar{i}_0$ | 50°.0079 |
| $\bar{\Omega}_0$ | 288°.1634 | $\bar{\xi}_0$ | 0.0010384276 |
| $\bar{\eta}_0$ | -0.0002674244 | $\bar{\lambda}_0$ | 32°.2032 |

Based on the initial quasi-mean elements, analytical perturbation model $\mathcal{M}_0$ describing theoretical orbital motion of the object during the current transit is determined according to formulas (1) to (6).

2) Firstly, a geocentric distance and a geocentric longitude and latitude of an observation station are calculated based on geodetic coordinates of the DLR system. Then, based on the analytical perturbation model $\mathcal{M}_0$, two-step calculation is performed. In a first step, moment $t^*_0$ of an approximate closest approach point is calculated based on $T_0$. In a second step, moment $\tilde{t}_0$ of an accurate closest approach point is obtained through iterative calculation based on $t^*_0$. The moment of the accurate closest approach point is a moment of a theoretical closest approach point of the object during the current transit.

3) It is estimated that absolute value $\tau$ of a maximum along-track error of the initial quasi-mean elements is 3 seconds, and $\varepsilon$ is set to 0.5 seconds. Therefore, $\Delta\tau$ is 0.5 seconds, and it is obtained through calculation that l=7. Then, calculation is performed according to a following formula:

$$\bar{\lambda}_k = \bar{\lambda}_0 + (\bar{n}_0 + \lambda_1)k\Delta\tau$$

$$k = 7, 6, \ldots, 0, \ldots, -6, -7$$

In the analytical perturbation model $\mathcal{M}_0$, $\bar{\lambda}_k$ is used to replace $\bar{\lambda}_0$ in turn to obtain a series of perturbation models $\mathcal{M}_k$. Each model $\mathcal{M}_k$ describes motion of a virtual object, and apparent path cluster $\{\Gamma_k|_{7,-7}\}$ is formed by apparent motion tracks of all virtual objects during the current transit.

4) Firstly, a moment of a closest approach point of each apparent path in the apparent path cluster $\{\Gamma_k|_{7,-7}\}$ is calculated. Then, a range and an elevation of the closest approach point of each apparent path are obtained. The visibility of the closest approach point of each apparent path is confirmed, and no undetectable apparent path is found. All undetectable apparent paths are removed, and an apparent path cluster formed by the remaining apparent paths is still $\{\Gamma_k|_{7,-7}\}$.

5) Detectable duration of an object in a descending segment is limited to not less than 10 seconds. For one apparent path $\Gamma_k$ in the apparent path cluster $\{\Gamma_k|_{7,-7}\}$, based on the model $\mathcal{M}_k$, search calculation is carried out backwards along the descending segment from moment $\tilde{t}_k$ of a closest approach point of the one apparent path at a step of 10 seconds. In the calculation, only one step is performed to obtain a target range and elevation on a corresponding calculation point, then are compared with the detection constraints of the DLR system. If not matched, the one apparent path is removed from the apparent path cluster; otherwise, the one apparent path is retained. For other apparent paths in the apparent path cluster $\{\Gamma_k|_{7,-7}\}$, the above processing process is repeated. An apparent path cluster formed by the finally remaining apparent paths is still $\{\Gamma_k|_{7,-7}\}$.

6) For one apparent path $\Gamma_k$ in the apparent path cluster $\{\Gamma_k|_{7,-7}\}$, a maximum detectable elevation of the one apparent path is an elevation of a closest approach point of the one apparent path, and a minimum detectable elevation of the one apparent path is obtained through search in an ascending segment of the one apparent path by using a dichotomous approach. During search calculation, an initial step of the dichotomous approach is set to 30 seconds, and convergence accuracy is set to $10^{-3}$ seconds. For other apparent paths in the apparent path cluster $\{\Gamma_k|_{7,-7}\}$, the above processing process is repeated to finally obtain maximum detectable elevations and minimum detectable elevations of all apparent paths. Maximum value $h_p$ is taken from the minimum detectable elevations of all the apparent paths, and minimum value $h_q$ is taken from the maximum detectable elevations of all the apparent paths, such that following values are obtained:

$$h_p = 5° \cdot 5000$$
$$h_q = 79° \cdot 9082$$

Closed interval $[h_p, h_q]$ is an elevation scope suitable for the DLR system to perform constant elevation search.

7) Starting search elevation $h^*=15°$ is selected from $[h_p, h_q]$. It is set that $\chi=10$ seconds, $\varepsilon_t=0.1$ seconds, and $\varepsilon_h=2°$. A relevant method in the step 7 of Embodiment 1 is used to calculate effective search period $[\bar{t}_b, \bar{t}_e]$ for elevation $\bar{h}$ and effective search period $[t_b, t_e]$ for elevation h. Finally, 26 search elevations with non-intersecting effective search periods are obtained. Based on one obtained search elevation, the steps 7, 8, and 9 of Embodiment 1 are performed in sequence to generate search-specific guidance data for the search elevation. Based on other obtained search elevations, the above processing process is repeated to ultimately generate search-specific guidance data for all the 26 search elevations. In the above processing process, when the step 7 of Embodiment 1 is performed for calculation, the initial step of the dichotomous approach is set to 30 seconds, and the convergence accuracy is set to $10^{-4}$ degrees. An atmospheric refraction effect contained in detection feature parameters is provided by the Hopfield model based on a ratio of 90%. When the step 9 of Embodiment 1 is performed for calculation, scaling factor $\delta$ is set to 0.1.

Figure 3:
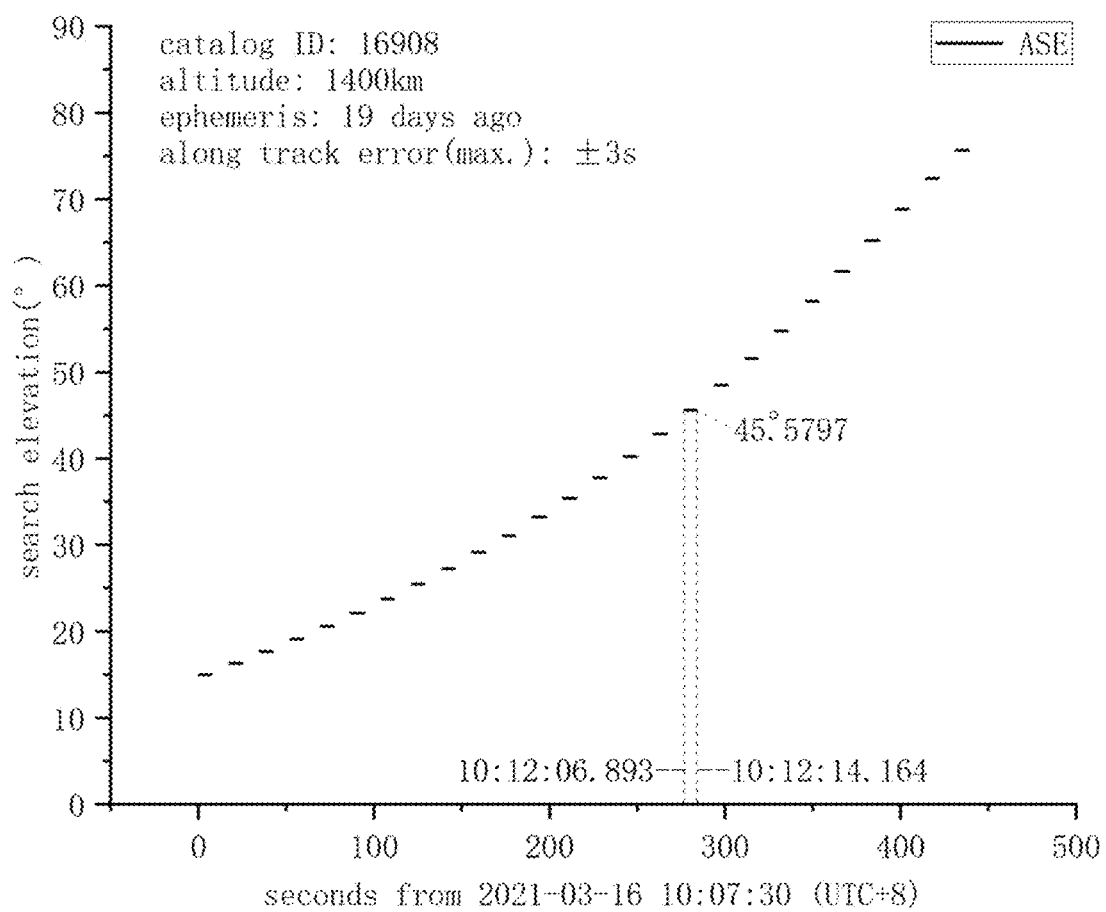
FIG. 3 shows a setting of a multi-search elevation of AJISAI.

FIG. 3 shows search elevations whose degrees are in an ascending order and their corresponding effective search periods in chronological order from left to right. As shown in FIG. 3, one of the search elevations is 45.5797 degrees, and a corresponding effective search period starts from 10:12:6.893 on Mar. 16, 2021 and ends at 10:12:14.164 on Mar. 16, 2021. A total of 19 sets of search-specific guidance data are generated for the elevation. The DLR system chronologically enables, based on each set of search-specific guidance data, the beam to dwell, to form a constant elevation search process.

Figure 4A:
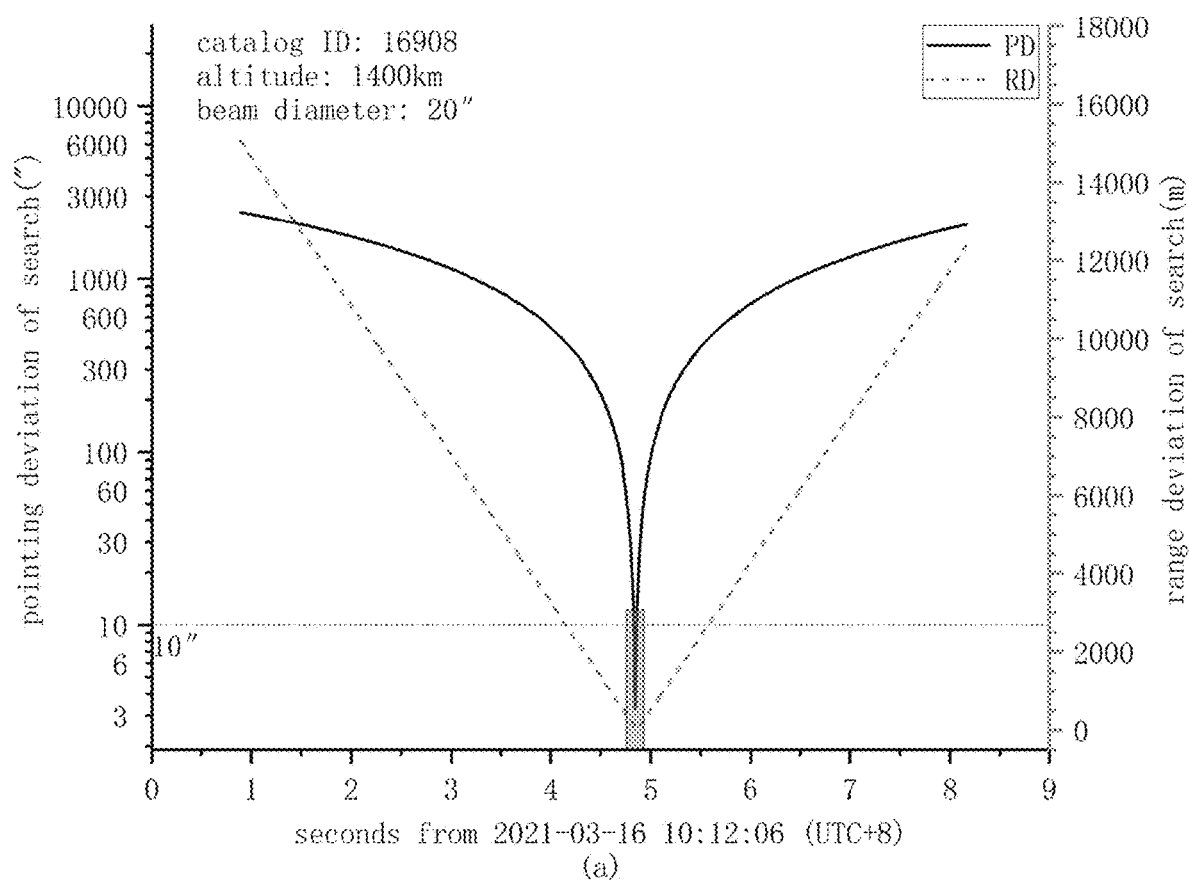
FIG. 4A shows that a pointing deviation (PD) and a range deviation (RD) of search of AJISAI vary with detection time.
Figure 4B:
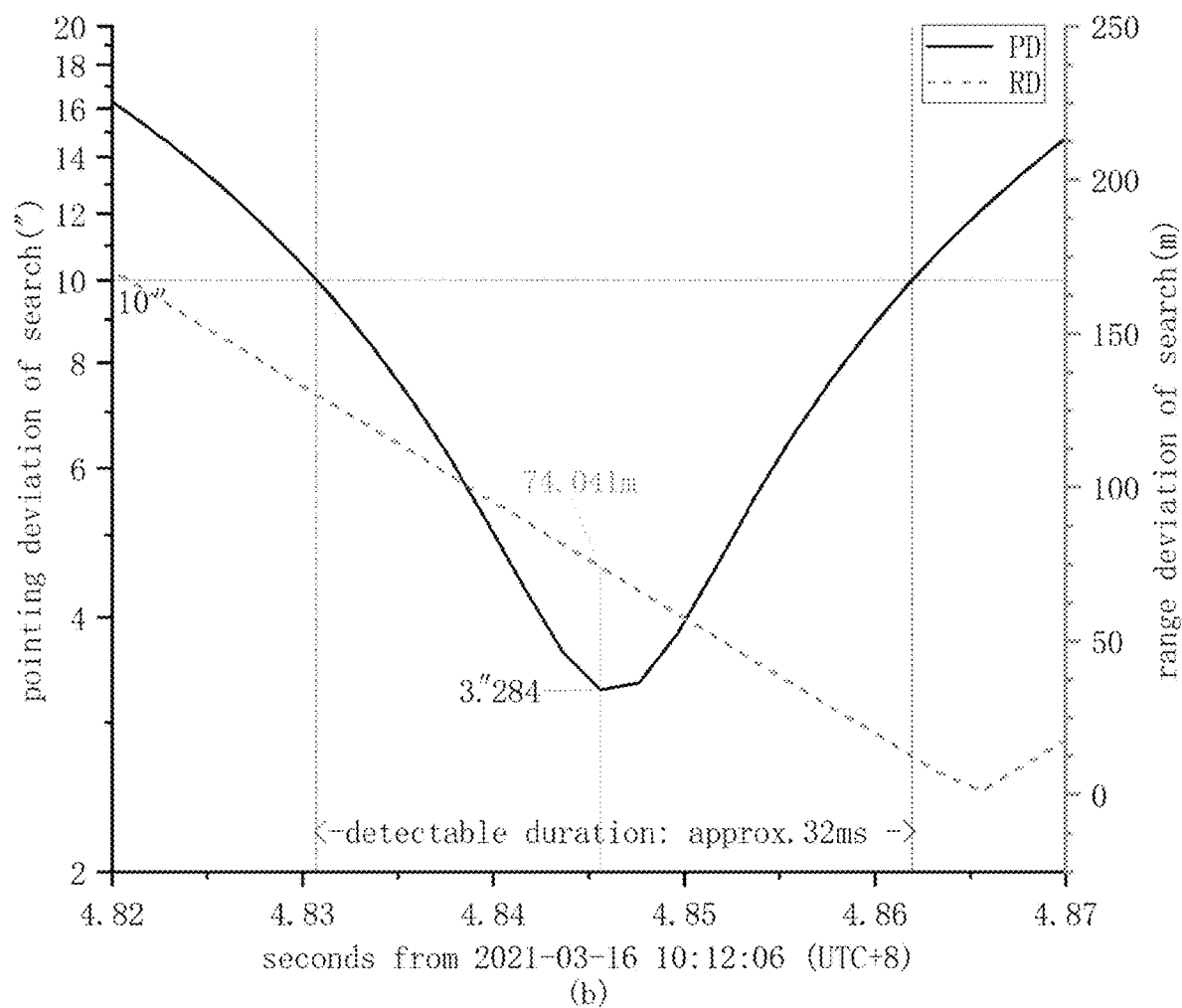
FIG. 4B shows a locally enlarged view of a PD curve and its corresponding RD curve within a shaded block in FIG. 4A.

For any detection moment during the current transit of the object, a target point at the moment can be generated by combining CPF ephemeris interpolation and the light travel time calculation. The atmospheric refraction effect when the DLR system detects the target point is considered, and the Hopfield model is used to calculate a refractive value to obtain one detection point corresponding to the target point, which is referred to as a standard point of the object at the moment. For any detection moment in the above constant elevation search process, a PD of the search of the object at the moment is defined as an included angle between a direction of a dwelling beam of the DLR system at the moment and a direction of a standard point of the object at the same moment, and an RD of the search of the object at the moment is defined as an absolute value of a difference between a reference range that is of the object and specified for the dwelling beam of the DLR system at the moment and a slant range of the standard point of the object at the same moment. A situation of detecting the object by the DLR system in the above constant elevation search process can be determined based on PDs of the search of the object at different detection moments. FIG. 4A and FIG. 4B are coordinate graphs with two Y-axes, which respectively show changes to the PD of search of the object and the RD of the search of the object over time in the above constant elevation search process. FIG. 4A shows change curves of the PD of search and the RD of the search over time in the entire search process. From FIG. 4A, it can be seen that the object enters the dwelling beam of the DLR system during a very short period in the search process, and the RD of the search during this period is also very small, indicating that the DLR system can detect the object in the search process. After the DLR system detects the object, range-gate filtering can be performed accurately to significantly improve detection and discovery probabilities of the object. To further demonstrate a detailed feature about searching the object by the DLR system, a PD curve and its corresponding RD curve in a shaded block of FIG. 4A are locally enlarged. As shown in FIG. 4B, it can be seen that it cumulatively takes about 32 milliseconds for the object to enter the dwelling beam of the DLR system. During the 32 milliseconds, a minimum PD of the search of the object can reach 3.284 arc seconds, and an RD of the search at the same moment is 74.041 meters.

Figure 5:
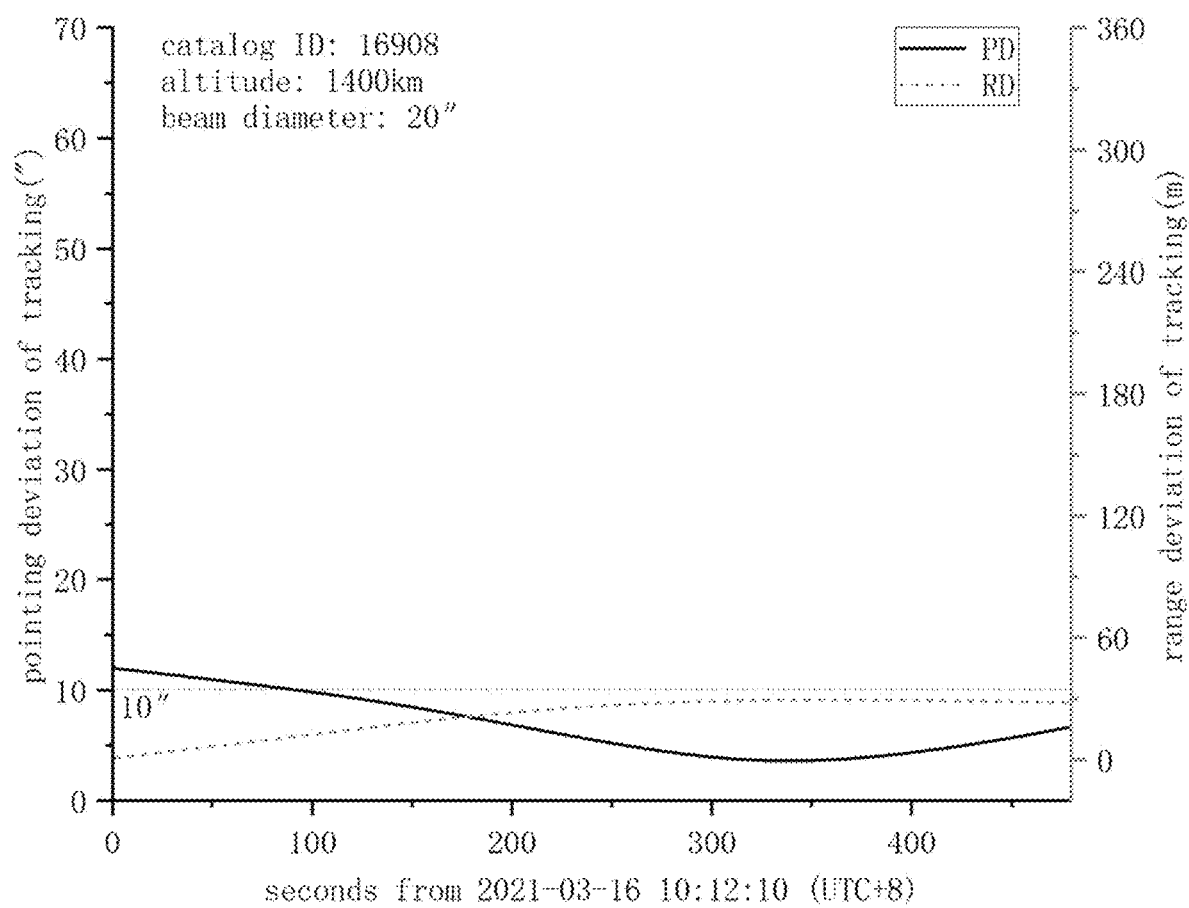
FIG. 5 shows that a PD and an RD of tracking of AJISAI vary with detection time.

8) After the DLR system detects the object in the above constant elevation search process, it is assumed that one set of detection data $\hat{t}$ and $\hat{\rho}$ is obtained, where $\hat{t}$ represents the detection moment, corresponding to 10:12:10.832 on Mar. 16, 2021 on Beijing time, and $\hat{\rho}$ represents the detection range, which is equal to $\hat{\rho}=1910478.253$ meters and obtained based on the standard point of the object at the detection moment. The one set of detection data is detected by an $11^{th}$ chronological dwelling beam of the DLR system. An along-track error is determined based on the one set of detection data (a ranging delay involved in the calculation is given by the Hopfield model based on the ratio of 90%), to obtain an along-track error, namely, $\epsilon=-323.742$ milliseconds. The along-track error is corrected for the initial quasi-mean elements of the object only based on the error $\epsilon$ generated by using the above one set of detection data. Tracking-specific guidance data of the object after moment $\hat{t}$ during the current transit is generated based on a set of corrected initial quasi-mean elements, which is detection azimuths, detection elevations, and detection ranges that correspond to a series of detection moments. The detection azimuth and the detection elevation are used to determine a tracking direction of the DLR system, and the detection range is used to perform the range-gate filtering on tracking echo signals of the DLR system. The atmospheric refraction effect contained in the above tracking-specific guidance data is given by the Hopfield model based on the ratio of 90%. For any detection moment in the above tracking process, a PD of the tracking of the object at the moment is defined as an included angle between a tracking direction of the DLR system at the moment and a direction of the standard point of the object at the same moment, and an RD of the tracking of the object at the moment is defined as an absolute value of a difference between a detection range at the moment and a slant distance of the standard point of the object at the same moment. A situation of detecting the object by the DLR system in the above tracking process can be determined based on PDs of the tracking of the object at various detection moments. FIG. 5 is a coordinate graph with two Y-axes, which shows change curves of the PD of the tracking of the object and the RD of the tracking of the object over time in the above tracking process. It can be seen from FIG. 5 that for most periods in the entire tracking process, the PD of the tracking of the object is less than 10 arc seconds. The PD of the tracking slightly exceeds 10 arc seconds only in a short period at the beginning of the tracking process, and the RD of the tracking does not exceed 30 meters throughout the entire tracking process. This indicates that the DLR system can basically detect the object throughout the entire tracking process, and can perform the range-gate filtering accurately to greatly improve the detection and discovery probabilities of the object.

Figure 6:
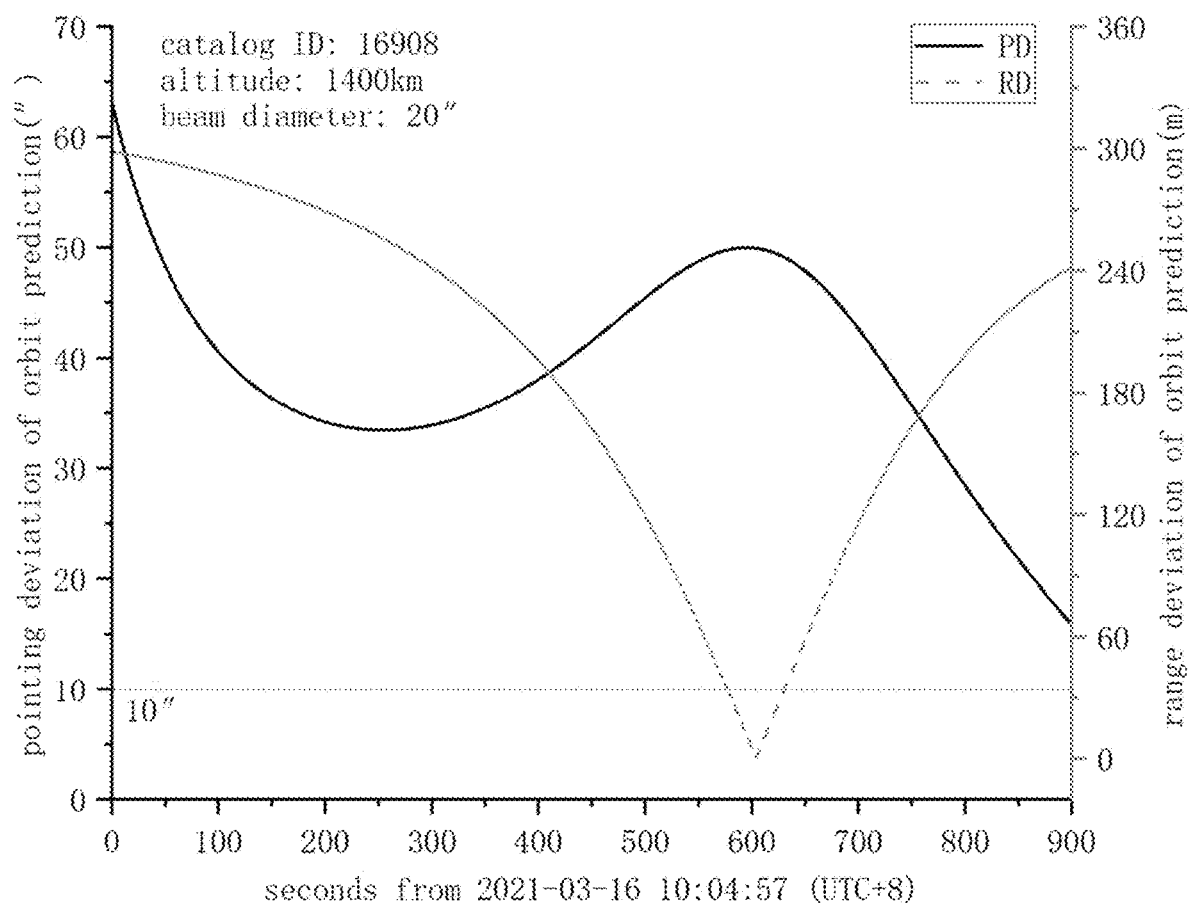
FIG. 6 shows that a PD and an RD of prediction of AJISAI vary with detection time.

Based on the orbital parameters $t_q$, $\vec{r}_q$, $\dot{\vec{r}}_q$, and $\epsilon_a$ and a high-precision perturbation calculation model, and taking into account the impact of the light travel time and the atmospheric refraction effect (given by the Hopfield model based on the ratio of 90%), the experiment generates orbital prediction data during the current transit, which are the detection azimuths, elevations, and ranges that correspond to a series of detection moments. For any of the above detection moments, a PD of the prediction of the object at the moment is defined as an included angle between a prediction direction of the object at the moment and a direction of the standard point of the object at the same moment, and an RD of the prediction of the object at the moment is defined as an absolute value of a difference between a detection range at the moment and a slant distance of the standard point of the object at the same moment. A situation of detecting the object by the DLR system under guidance of the above orbital predictions can be determined based on PDs of the prediction of the object at various detection moments. FIG. 6 is a coordinate graph with two Y-axes, which shows change curves of the PD of the prediction of the object and the RD of the prediction of the object over time during the current transit. From FIG. 6, it can be seen that the PD of the prediction of the object is greater than 10 arc seconds throughout the entire transit period and reaches tens of arc seconds in most of the transit period. The RD of the prediction of the object exceeds 100 meters in most of the transit period, and the PD of the prediction of the object exceeds 40 arc seconds in a period in which the RD of the prediction is less than 100 meters. This indicates that the DLR system is difficult to discover the object directly based on the guidance of the orbital predictions during the current transit, thus fully reflecting progressiveness of the technology in the present disclosure.

Embodiment 3

This embodiment selects SWARM B (NASA catalog number 39451) as an experimental object, which has an orbital height of 490 kilometers and is a laser calibration satellite. In the experiment, one set of orbital parameters of the object relative to the J2000 geocentric inertial system is generated based on detection data obtained by a precision tracking radar in China, namely $t_q$, $\vec{r}_q$, $\dot{\vec{r}}_q$, and $\epsilon_a$, as shown in Table 3:

TABLE 3

One set of orbital parameters of the SWARM B relative to the J2000 geocentric inertial coordinate system

| $t_q$(Beijing time) | | Feb. 28, 2021 10:35:25.752 | | | |
|---|---|---|---|---|---|
| $\vec{r}_q$ (m) | $x_q$ | −176610.508 | $\dot{\vec{r}}_q$ (m/s) | $\dot{x}_q$ | −6988.727 |
| | $y_q$ | 223433.934 | | $\dot{y}_q$ | −2974.227 |
| | $z_q$ | −6881097.319 | | $\dot{z}_q$ | 83.572 |
| $\epsilon_a$(m²/kg) | | | 0.00027282 | | |

The experiment is based on the one set of orbital parameters and specified detection constraints of a DLR system, and a certain transit of the object is determined through high-precision perturbation calculation. The transit is a transit after 14 days starting from the epoch moment of the orbital parameters of the object. During the transit, search, and tracking experiments of the object are carried out.

1) A set of initial quasi-mean elements of the object at an intermediate moment during the current transit is obtained through perturbation propagation and conversion, as shown in Table 4:

TABLE 4

Initial quasi-mean elements of SWARM B at the intermediate moment during the transit

| $T_0$ (Beijing time) | | Mar. 14, 2021 14:56:08.900 | |
|---|---|---|---|
| $\bar{a}_0$(m) | 6875051.448 | $\bar{i}_0$ | 87°.7608 |
| $\bar{\Omega}_0$ | 198°.7996 | $\bar{\xi}_0$ | −0.0000120676 |
| $\bar{\eta}_0$ | −0.0012949970 | $\bar{\lambda}_0$ | 153°.2184 |

2) A moment of a theoretical closest approach point of the object during the current transit is calculated.
3) It is estimated that absolute value $\tau$ of a maximum along-track error of the initial quasi-mean elements is 30 seconds, and it is obtained that $\Delta\tau$ is 0.5 seconds. It is obtained through calculation that l=61. Then, apparent path cluster $\{\Gamma_k|_{61,-61}\}$ is generated.
4) After all undetectable apparent paths are removed, an apparent path cluster formed by the remaining apparent paths is still $\{\Gamma_k|_{61,-61}\}$.
5) All apparent paths with unsatisfactory detectable arc lengths are removed, and an apparent path cluster formed by the remaining apparent paths is still $\{\Gamma_k|_{61,-61}\}$.
6) Elevation scope [$h_p$, $h_q$] suitable for the DLR system to perform constant elevation search is determined, where $$h_p = 5° \cdot 5001$$

$$h_q = 81° \cdot 0686$$

7) According to the processing methods in the steps 7, 8, and 9 in Embodiment 1, a total of three search elevations with non-intersecting effective search periods are obtained, and search-specific guidance data is generated for each search elevation.

Figure 7:
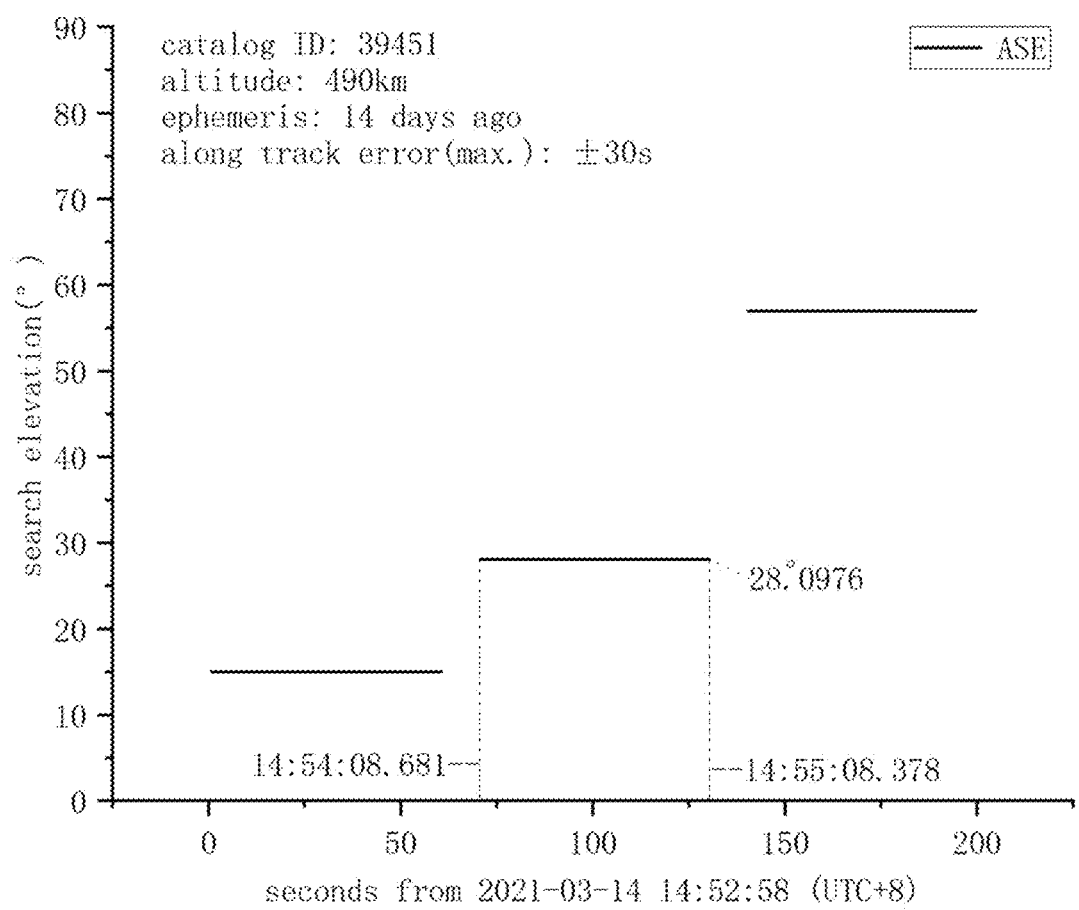
FIG. 7 shows a setting of a multi-search elevation of SWARM B.

FIG. 7 shows search elevations whose degrees are in an ascending order and their corresponding effective search periods in chronological order from left to right. As shown in FIG. 7, one of the search elevations is 28.0976 degrees, and a corresponding effective search period starts from 14:54:8.681 on Mar. 14, 2021 and ends at 14:55:8.378 on Mar. 14, 2021. A total of 307 sets of search-specific guidance data are generated for the elevation. The DLR system chronologically enables, based on each set of search-specific guidance data, the beam to dwell, to form a constant elevation search process.

Figure 8A:
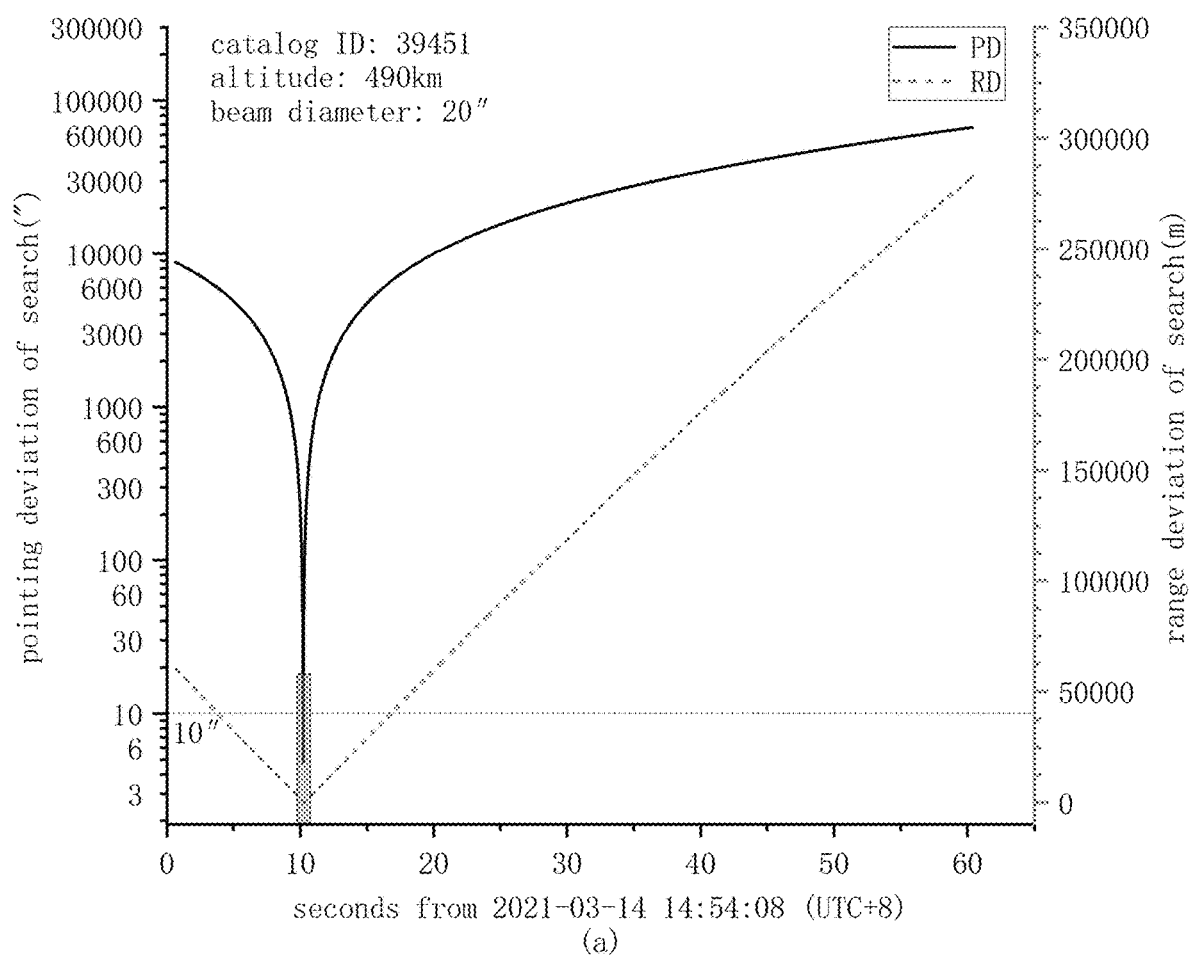
FIG. 8A shows that a PD and an RD of search of SWARM B vary with detection time.
Figure 8B:
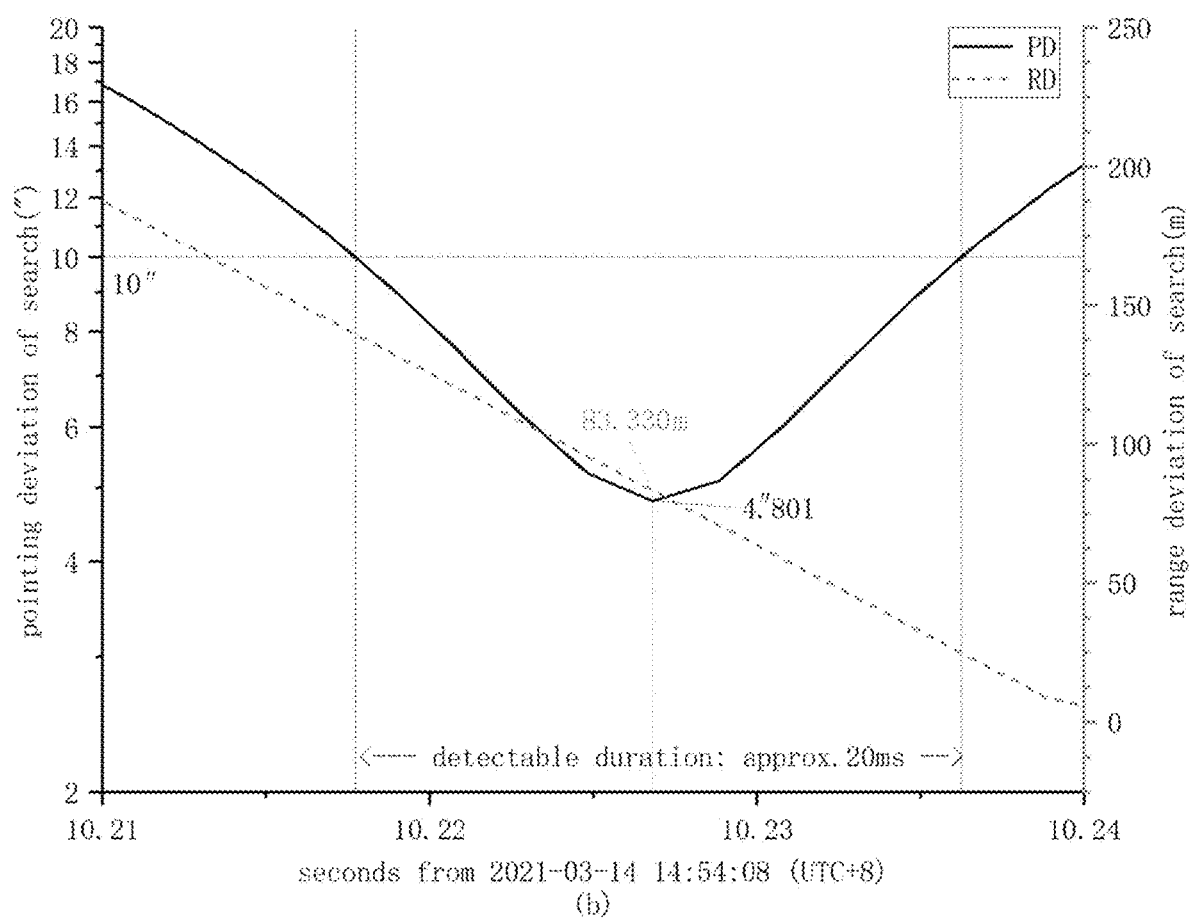
FIG. 8B shows a locally enlarged view of a PD curve and its corresponding RD curve within a shaded block in FIG. 8A.

FIG. 8A and FIG. 8B are coordinate graphs with two Y-axes, which respectively show changes to a PD of the search of the object and an RD of the search of the object over time in the above constant elevation search process. FIG. 8A shows change curves of the PD of the search and the RD of the search over time in the entire search process. From FIG. 8A, it can be seen that the object enters a dwelling beam of the DLR system during a very short period in the search process, and the RD of the search during this period is also very small, indicating that the DLR system can detect the object in the search process. After the DLR system discovers the object, range-gate filtering can be performed accurately to significantly improve detection and discovery probabilities of the object. To further demonstrate a detailed feature about detecting the object by the DLR system, a PD curve and its corresponding RD curve in a shaded block of FIG. 8A are locally enlarged. As shown in FIG. 8B, it can be seen that it cumulatively takes about 20 milliseconds for the object to enter the dwelling beam of the DLR system. During the 20 milliseconds, a minimum PD of the search of the object can reach 4.801 arc seconds, and an RD of the search at the same moment is 83.330 meters.

8) After the DLR system detects the object in the above constant elevation search process, it is assumed that one set of detection data $\hat{t}$ and $\hat{\rho}$ is obtained, where $\hat{t}$ represents the detection moment, corresponding to 14:54:18.219 on Mar. 14, 2021 on Beijing time, and $\hat{\rho}$ represents the detection range, which is equal to $\hat{\rho}=955312.332$ meters. The one set of detection data is detected by a $50^{th}$ chronological dwelling beam of the DLR system. Based on the one set of detection data, an along-track error is determined to obtain an along-track error, namely $\epsilon=20385.021$ milliseconds. The along-track error is corrected for the initial quasi-mean elements of the object only based on the error $\epsilon$ generated by using the above one set of detection data. Tracking-specific guidance data of the object after moment $\hat{t}$ during the current transit is generated based on a set of corrected initial quasi-mean elements.

Figure 9:
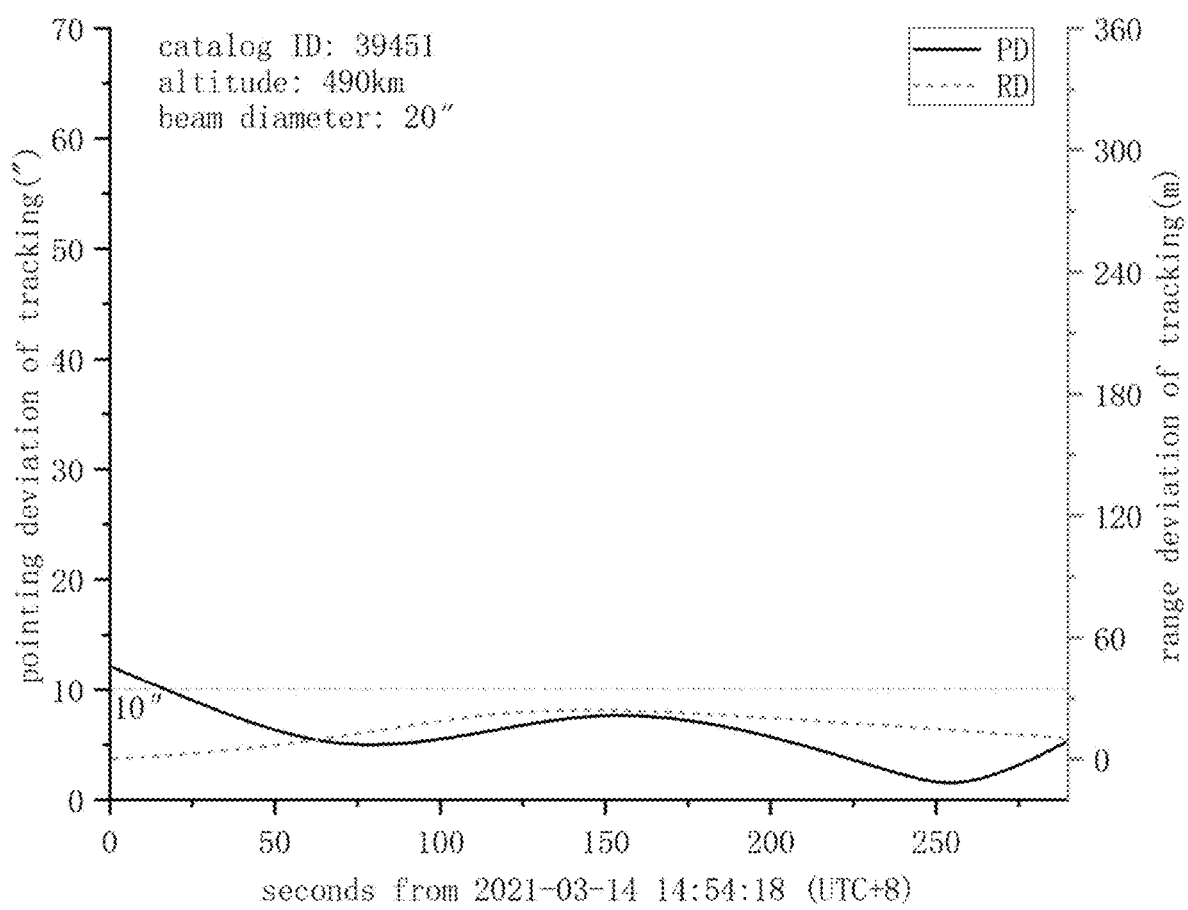
FIG. 9 shows that a PD and an RD of tracking of SWARM B vary with detection time.

FIG. 9 is a coordinate graph with two Y-axes, which shows change curves of the PD of the tracking of the object and the RD of the tracking of the object over time in the above tracking process. It can be seen from FIG. 9 that for most periods in the entire tracking process, the PD of the tracking of the object is less than 10 arc seconds. The PD of the tracking slightly exceeds 10 arc seconds only in a short period at the beginning of the tracking process, and the RD of the tracking of the object does not exceed 30 meters throughout the entire tracking process. This indicates that the DLR system can basically detect the object throughout the entire tracking process, and can perform the range-gate filtering accurately to greatly improve the detection and discovery probabilities of the object.

Figure 10:
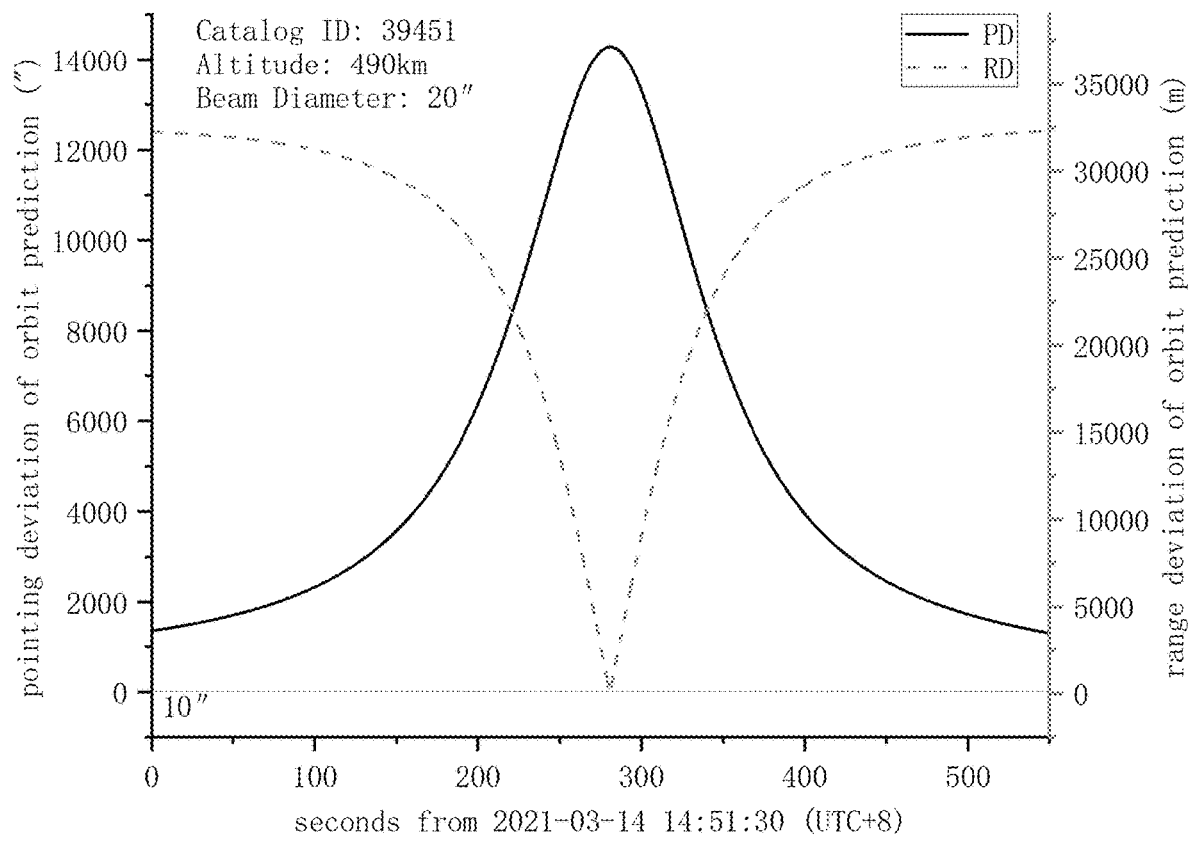
FIG. 10 shows that a PD and an RD of prediction of SWARM B vary with detection time.

FIG. 10 is a coordinate graph with two Y-axes, which shows change curves of the PD of a prediction of the object and the RD of the prediction of the object over time during the current transit. From FIG. 10, it can be seen that the PD of the prediction of the object is greater than 1,000 arc seconds throughout the transit. The RD of the prediction of the object exceeds 5,000 meters in most periods, and the PD of the prediction of the object exceeds 12,000 arc seconds in a period in which the RD of the prediction is less than 5,000 meters. This indicates that it is difficult to discover the object directly based on guidance of the orbital predictions during DLR detection, thus fully reflecting progressiveness of the technology in the present disclosure.

Embodiment 4

This embodiment provides a computer-readable storage medium. The computer-readable storage medium stores a computer program, and the computer program enables a computer to perform the search and tracking method for full time-domain laser detection of space debris in Embodiment 1.

Embodiment 5

This embodiment provides an electronic device, including a memory, a processor, and a computer program stored in the memory and executable on the processor. The processor, when executing the computer program, implements the search and tracking method for full time-domain laser detection of space debris in Embodiment 1.

In the embodiments of the present disclosure, the computer storage medium may be a tangible medium that may contain or store a program used by or used in combination with an instruction execution system, apparatus or device. The computer storage medium may be, but is not limited to, an electronic, magnetic, optical, electromagnetic, infrared, or semiconductor system, apparatus or device, or any combination thereof. More specific examples of the computer storage medium include: an electrical connection with one or more wires, a portable computer disk, a hard disk, a random access memory (RAM), a read-only memory (ROM), an erasable programmable ROM (an EPROM or a flash memory), an optical fiber, a portable compact disc read-only memory (CD-ROM), an optical storage device, a magnetic storage device, or any suitable combination thereof.

A person of ordinary skill in the art may be aware that, in combination with the examples described in the embodiments disclosed in the present disclosure, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

What is described above is merely the preferred implementations of the present disclosure, the scope of protection of the present disclosure is not limited to the above embodiments, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

What is claimed is:

1. A search and tracking method for full time-domain laser detection of space debris, implemented during each transit of a space debris object relative to a debris laser ranging (DLR) system, and comprising:

based on a set of precision orbital parameters of an object that are determined based on data of precision radars and/or charge-coupled device (CCD) telescopes of a space monitoring network, and by taking an intermediate moment determined based on pre-obtained start and end moments of a current transit of the object as an initial time, generating a set of initial quasi-mean elements, and then constructing an analytical perturbation model based on the set of initial quasi-mean elements;

discretizing an along-track error, then obtaining, based on the discretizing and in combination with the analytical perturbation model, a series of new perturbation models for describing motion of all virtual objects, and forming an apparent path cluster by different apparent paths generated from the virtual objects during the current transit;

determining a maximum detectable elevation $h_q$ and a minimum detectable elevation $h_p$ of each valid apparent path in the apparent path cluster, and then calculating search elevations of the DLR system;

for each valid apparent path in the apparent path cluster, calculating a corresponding detection elevation based on a corresponding perturbation model and in consideration of an impact of the light travel time, and obtaining, by using a dichotomous approach based on a difference between the detection elevation and the search elevation, detection feature parameters of virtual objects corresponding to all apparent paths when the virtual objects rise to the search elevation;

generating a series of sets of search-specific guidance data based on the detection feature parameters of the virtual objects, wherein each set of search-specific guidance data corresponds to one dwell of a laser beam emitted by the DLR system on the search elevation;

performing, by the DLR system, multi-elevation search on the object based on the search-specific guidance data; and switching to, by the DLR system, a tracking process after detecting the object, calculating an along-track error of the initial quasi-mean elements based on a few sets of detection data obtained before switching to the tracking process, to correct an along-track error of the initial quasi-mean elements, and generating tracking-specific guidance data based on a set of corrected initial quasi-mean elements to guide the DLR system to track the object, wherein the method further comprises after constructing the analytical perturbation model, calculating, in combination with the constructed analytical perturbation model, a moment of a theoretical closest approach point of the object during the current transit; and for the apparent path cluster formed by the different apparent paths generated from the virtual objects during the current transit, determining visibility of each apparent path in the apparent path cluster based on the calculated moment of the theoretical closest approach point, removing all the invisible apparent paths and further removing all the apparent paths with an unsatisfactory detectable arc length, and taking the remaining apparent paths as valid apparent paths; and after obtaining the detection feature parameters of the virtual objects corresponding to all the valid apparent paths when the virtual objects rise to the search elevation, performing continuation processing on a value of an azimuth in the detection feature parameters to make the value of the azimuth change continuously.

2. The search and tracking method for full time-domain laser detection of space debris according to claim 1, wherein the step of constructing the analytical perturbation model comprises:

selecting the intermediate moment $T_0$ of the current transit of the object as a reference moment, defining an orbital along-track error of the object during the current transit as an along-track error at the reference moment, and using the first-type nonsingular orbital elements as basic variables to construct an analytical perturbation model with the reference moment as the initial time:

assuming that one set of known precision orbital parameters of the object are $t_q$, $\vec{r}_q$, $\dot{\vec{r}}_q$, and $\epsilon_a$, wherein $t_q$ represents an epoch moment of the one set of orbital parameters, $\vec{r}_q$ and $\dot{\vec{r}}_q$ respectively represent a position vector and a velocity vector of the object relative to an epoch geocentric inertial coordinate system, and $\epsilon_a$ represents an area-mass ratio of the object, performing perturbation propagation by using a numerical method and a precision dynamic model based on the known orbital parameters $t_q$, $\vec{r}_q$, $\dot{\vec{r}}_q$, and $\epsilon_a$, performing propagation from the moment $t_q$ to the moment $T_0$ to obtain a position vector $\vec{r}_0$ and a velocity vector $\dot{\vec{r}}_0$ of the object relative to the epoch geocentric inertial coordinate system at the moment $T_0$, performing conversion on $\vec{r}_0$ and $\dot{\vec{r}}_0$ to obtain a set of initial quasi-mean elements of the object at the moment $T_0$, and constructing, based on the initial quasi-mean elements, an analytical perturbation model with a following mathematical expression:

assuming that a, i, $\Omega$, $\xi = e \cos \omega$, $\eta = -e \sin \omega$, and $\lambda = \omega + M$ are first-type nonsingular osculating orbital elements of the object, wherein a represents an orbital semi-major axis, i represents an orbital inclination, $\Omega$ represents an orbital right ascension of ascending node, e represents an orbital eccentricity, $\omega$ represents an orbital argument of perigee, and M represents an orbital mean anomaly, obtaining following formulas:

$$a(t) = \bar{a}_0 + a_s^{(1)}(t) + a_s^{(2)}(t) \qquad (1)$$

$$i(t) = \bar{i}_0 + i_s^{(1)}(t) + i_s^{(2)}(t) \qquad (2)$$

$$\Omega(t) = \bar{\Omega}_0 + \Omega_1(t - T_0) + \Omega_s^{(1)}(t) + \Omega_s^{(2)}(t) \qquad (3)$$

$$\xi(t) = \bar{\xi}_0 \cos[\omega_1(t - T_0)] + \bar{\eta}_0 \sin[\omega_1(t - T_0)] + \xi_s^{(1)}(t) + \xi_s^{(2)}(t) \qquad (4)$$

$$\eta(t) = \bar{\eta}_0 \cos[\omega_1(t - T_0)] - \bar{\xi}_0 \sin[\omega_1(t - T_0)] + \eta_s^{(1)}(t) + \eta_s^{(2)}(t) \qquad (5)$$

$$\lambda(t) = \bar{\lambda}_0 + (\bar{n}_0 + \lambda_1)(t - T_0) + \lambda_s^{(1)}(t) + \lambda_s^{(2)}(t) \qquad (6)$$

wherein in the above formulas, a left side represents osculating elements at a moment t, $\bar{a}_0$, $\bar{i}_0$, $\bar{\Omega}_0$, $\bar{\xi}_0$, $\bar{\eta}_0$, and $\bar{\lambda}_0$ represent initial quasi-mean elements at the moment $T_0$, $\bar{n}_0 = \sqrt{\mu} \bar{a}_0^{-3/2}$ represents an angular velocity of mean motion of the object, $\mu$ represents the geocentric gravitational constant, $\Omega_1$, $\omega_1$, and $\lambda_1$ represent coefficients of first-order long-term variation items of corresponding elements, $a_s^{(1)}$, $i_s^{(1)}$, $\Omega_s^{(1)}$, $\xi_s^{(1)}$, $\eta_s^{(1)}$, and $\lambda_s^{(1)}$ represent first-order short-period variation items of various elements, and $a_s^{(2)}$, $i_s^{(2)}$, $\Omega_s^{(2)}$, $\xi_s^{(2)}$, $\eta_s^{(2)}$, and $\lambda_s^{(2)}$ represent second-order short-period variation items of the elements, which are reduced-order items related to rotation of the Earth.

3. The search and tracking method for full time-domain laser detection of space debris according to claim 2, wherein the step of forming the apparent path cluster by different apparent paths generated from the virtual objects during the current transit comprises:

taking the along-track error of the initial quasi-mean elements as a random variable uniformly distributed within $[-\tau, \tau]$, discretizing the random variable to convert a probability problem into a certainty problem, and defining a following formula:

$$\overline{\lambda}_k = \overline{\lambda}_0 + (\overline{n}_0 + \lambda_1) k \Delta \tau \quad k = l, l-1, \ldots, 0, -1, \ldots, -l+1, -l$$

wherein $\Delta \tau$ represents a time increment, and assuming that $\varepsilon > 0$ is a small value, a value of $\Delta \tau$ is as follows:

$$\begin{cases} \Delta \tau = \varepsilon & \tau \geq 2\varepsilon \\ \Delta \tau = \tau/2 & \tau < 2\varepsilon \end{cases}$$

l is a positive integer, and is valued as follows:

$$l = \text{int}(\tau/\Delta \tau) + 1$$

in the constructed analytical perturbation model, replacing $\overline{\lambda}_0$ in the formula (6) with $\overline{\lambda}_k$, and keeping other formulas unchanged to obtain the series of new perturbation models, which are denoted as a model $\mathcal{M}_k$, wherein each model $\mathcal{M}_k$ corresponds to one virtual object, and a virtual object corresponding to $\mathcal{M}_0$ is a theoretical object; and when k continuously changes from l to −l, generating, by each virtual object, a series of apparent paths to form an apparent path cluster $\{\Gamma_k|_{l,-l}\}$, wherein each apparent path $\Gamma_k$ is uniquely determined by the model $\mathcal{M}_k$.

4. The search and tracking method for full time-domain laser detection of space debris according to claim 3, wherein the step of obtaining the detection feature parameters of the virtual objects corresponding to all valid apparent paths when the virtual objects rise to the search elevation comprises:

for one apparent path $\Gamma_k$ in an apparent path cluster $\{\Gamma_k|_{m,n}\}$, wherein $\{\Gamma_k|_{m,n}\}$ represents an apparent path cluster obtained by removing all the invisible apparent paths and further removing all the apparent paths with an unsatisfactory detectable arc length from $\{\Gamma_k|_{l,-l}\}$, performing search calculation forwards from a moment $t_k$ of a closest approach point along a rising segment by using the dichotomous approach based on the model $\mathcal{M}_k$, generating, in each step, a position vector of the object relative to a True Equator and Mean Equinox of Epoch (TEMEE) coordinate system at a corresponding moment, calculating a corresponding detection elevation based on the position vector and by considering the impact of the light travel time and an atmospheric refraction effect, determining a processing method for a next step based on a difference between the detection elevation and the search elevation, and finally obtaining detection feature parameters of the object when the object rises to the search elevation, comprising a detection moment, a detection range, and a detection azimuth; and repeating the above process for other apparent paths in the apparent path cluster to obtain detection feature parameters corresponding to all virtual objects.

5. The search and tracking method for full time-domain laser detection of space debris according to claim 4, wherein the step of generating the series of sets of search-specific guidance data comprises:

for one apparent path $\Gamma_k$ in the apparent path cluster $\{\Gamma_k|_{m,n}\}$, wherein a detection moment, a detection range, and a detection azimuth of a corresponding virtual object when the virtual object rises to the search elevation are respectively $t_k$, $\rho_k$, and $A'_k$, and $A'_k$ represents an azimuth after the continuation processing, taking $t_k$ as a base point, and constructing, through cubic spline interpolation based on the known parameter $\rho_k$ on the base point, an interpolation function in which a detection range $\rho$ varies with a detection moment t; and taking $A'_k$ as a base point, and constructing, through the cubic spline interpolation based on the known parameter $t_k$ on the base point, an interpolation function in which a detection moment t varies with a detection azimuth $A'$, wherein the obtained interpolation functions are as follows:

$$\rho = \rho(t) \quad (9)$$

$$t = t(A') \quad (10)$$

a detection time scope when the real object rises to the search elevation is an effective search period, which is a closed interval $[t_m, t_n]$; a corresponding azimuth detection scope is a closed interval $[A'_m, A'_n]$, which corresponds to an azimuth interval; and when the DLR system performs search along the search elevation, a change interval for a direction of the laser beam is $[\psi_m, \psi_n]$, and a length of the interval is as follows:

$$\Delta \psi = |\psi_m - \psi_n|$$

a length of the azimuth interval of the object on the search elevation is as follows:

$$\Delta A = |A'_m - A'_n|$$

obtaining, based on a differential geometry relationship, the length of the change interval for the direction of the laser beam:

$$\Delta \psi = \cosh \Delta A$$

wherein h represents the search elevation of the DLR system;

evenly dividing the interval $[\psi_m, \psi_n]$ into a plurality of subintervals based on an effective diameter w of the laser beam, wherein a quantity of the subintervals obtained through the division is as follows:

$$N = \text{int}\left[\frac{\Delta\psi}{(1-\delta)w}\right] + 1$$

wherein δ represents a dimensionless scaling factor whose value is within an interval [0,1); and the azimuth interval and [$\psi_m$, $\psi_n$] are divided in a same manner, such that a length of an azimuth subinterval is as follows:

$$\Delta A^* = \Delta A/N$$

defining a symbol factor:

$$\kappa = \begin{cases} 1 & A'_m < A'_n \\ -1 & A'_m > A'_n \end{cases}$$

wherein azimuth subintervals are sequentially [$\tilde{A}^*_v$, $\tilde{A}^*_{v+1}$], wherein v=1, 2, . . . , N, such that two endpoint values of each azimuth subinterval are obtained by recursion as follows:

$$\tilde{A}^*_1 = A'_m$$

$$\tilde{A}^*_{v+1} = \tilde{A}^*_v + \kappa\Delta A^*$$

setting [$t^*_v$, $t^*_{v+1}$] to be a time subinterval corresponding to the azimuth subinterval [$\tilde{A}^*_v$, $\tilde{A}^*_{v+1}$], such that two endpoint values of the time subinterval are separately calculated according to the formula (10):

$$t^*_v = t(\tilde{A}^*_v)$$

$$t^*_{v+1} = t(\tilde{A}^*_{v+1})$$

calculating a center azimuth of the azimuth subinterval [$\tilde{A}^*_v$, $\tilde{A}^*_{v+1}$] according to a following formula:

$$\tilde{A}^*_{v+1/2} = (\tilde{A}^*_v + \tilde{A}^*_{v+1})/2$$

calculating, according to the formula (10), a detection moment corresponding to the center azimuth:

$$\tau^*_{v+1/2} = \tau(\tilde{A}^*_{v+1/2})$$

calculating, according to the formula (9), a detection range corresponding to the center azimuth:

$$\rho^*_{v+1/2} = \rho(t^*_{v+1/2})$$

restoring the center azimuth $\tilde{A}^*_{v+1/2}$, which is a result obtained after the continuation processing, to an expression before the continuation processing, wherein a corresponding value $A^*_{v=1/2}$ is as follows:

$$A^*_{v+1/2} = \begin{cases} \tilde{A}^*_{v+1/2} - 2\pi & \tilde{A}^*_{v+1/2} \geq 2\pi \\ \tilde{A}^*_{v+1/2} + 2\pi & \tilde{A}^*_{v+1/2} < 0 \\ \tilde{A}^*_{v+1/2} & 0 \leq \tilde{A}^*_{v+1/2} < 2\pi \end{cases}$$

through the above processing process, generating a series of sets of search-specific guidance data $A^*_{v+1/2}$, $t^*_v$, $t^*_{v+1}$, and $\rho^*_{v+1/2}$, wherein v=1, 2, . . . , N, $A^*_{v+1/2}$ represents an azimuth of the direction of the beam, $t^*_v$ and $t^*_{v+1}$ respectively represent start and end dwell moments of the beam, and $\rho^*_{v+1/2}$ represents a specified reference range of the object during the beam dwell.

6. A search and tracking method for full time-domain laser detection of space debris, implemented during each transit of a space debris object relative to a debris laser ranging (DLR) system, and comprising:

based on a set of precision orbital parameters of an object that are determined based on data of precision radars and/or charge-coupled device (CCD) telescopes of a space monitoring network, and by taking an intermediate moment determined based on pre-obtained start and end moments of a current transit of the object as an initial time, generating a set of initial quasi-mean elements, and then constructing an analytical perturbation model based on the set of initial quasi-mean elements;

discretizing an along-track error, then obtaining, based on the discretizing and in combination with the analytical perturbation model, a series of new perturbation models for describing motion of all virtual objects, and forming an apparent path cluster by different apparent paths generated from the virtual objects during the current transit;

determining a maximum detectable elevation $h_q$ and a minimum detectable elevation $h_p$ of each valid apparent path in the apparent path cluster, and then calculating search elevations of the DLR system;

for each valid apparent path in the apparent path cluster, calculating a corresponding detection elevation based on a corresponding perturbation model and in consideration of an impact of the light travel time, and obtaining, by using a dichotomous approach based on a difference between the detection elevation and the search elevation, detection feature parameters of virtual objects corresponding to all apparent paths when the virtual objects rise to the search elevation;

generating a series of sets of search-specific guidance data based on the detection feature parameters of the virtual objects, wherein each set of search-specific guidance data corresponds to one dwell of a laser beam emitted by the DLR system on the search elevation;

performing, by the DLR system, multi-elevation search on the object based on the search-specific guidance data; and switching to, by the DLR system, a tracking process after detecting the object, calculating an along-track error of the initial quasi-mean elements based on a few sets of detection data obtained before switching to the tracking process, to correct an along-track error of the initial quasi-mean elements, and generating tracking-specific guidance data based on a set of corrected initial quasi-mean elements to guide the DLR system to track the object, wherein the step of performing, by the DLR system, multi-elevation search on the object based on the search-specific guidance data comprises:

generating a series of gradually increasing search elevations according to a principle that search elevations are generated in an ascending order and effective search periods of the search elevations do not intersect with each other, generating search-specific guidance data for each search elevation, and starting, by the DLR system based on the search-specific guidance data for the corresponding search elevation, search from a start search elevation and gradually switching to a highest search elevation, wherein the series of gradually increasing search elevations are generated according to following steps:

1) selecting a start search elevation h* between a minimum searchable elevation $h_p$ and a maximum searchable elevation $h_q$; presetting a constant $\chi$, wherein $\chi>0$ represents adjustment time required for the DLR system to switch from one search elevation to another search elevation; and setting k=1, $h_k$=h*, and $\tilde{h}$=h*, wherein $h_k$ represents a to-be-generated search elevation;
2) calculating an effective search period $[\tilde{t}_b, \tilde{t}_e]$ of the DLR system on the elevation $\tilde{h}$, and setting $h_n=\tilde{h}$ and $h_x=h_q$;
3) setting h=$(h_n+h_x)/2$, calculating an effective search period $[t_b, t_e]$ of the DLR system on the elevation h, and performing calculation according to $\zeta=t_b-\tilde{t}_e-\chi$;
4) if $|\zeta|<\varepsilon_t$, setting k=k+1, $h_k$=h, and $\tilde{h}$=h, and performing the step 2) to continue the calculation, wherein $\varepsilon_t$ represents a given small value relative to $\chi$; otherwise, performing next calculation;
5) setting $\Delta h=h_q-h$; and if $\zeta<0$ and $\Delta h<\varepsilon_h$, ending the calculation process, wherein $\varepsilon_h$ represents a given small value; otherwise, performing next calculation; and
6) if $\zeta<0$, setting $h_n$=h, and performing the step 3) to continue the calculation; otherwise, setting $h_x$=h, and performing the step 3) to continue the calculation; and obtaining the series of gradually increasing search elevations $h_k$ according to the above setting method.

7. The search and tracking method for full time-domain laser detection of space debris according to claim 3, wherein the step of calculating the along-track error of the initial quasi-mean elements based on a few sets of detection data obtained before switching to the tracking process, to correct the along-track error of the initial quasi-mean elements, and generating the tracking-specific guidance data based on the corrected initial quasi-mean elements comprises:

setting one set of detection data obtained by the DLR system before switching to the tracking process as $\hat{t}$ and $\hat{\rho}$, which is obtained during a certain dwell of the laser beam on a certain search elevation, wherein $\hat{t}$ represents a detection moment, $\hat{\rho}$ represents a corresponding detection range;

1) setting an iterative initial value $\epsilon=0$ of the along-track error, and using an atmospheric correction model to calculate a ranging delay $\Delta\rho$ caused by tropospheric refraction;
2) performing calculation according to $\overline{\lambda}_\epsilon=\overline{\lambda}_0+(\overline{n}_0+\lambda_1)\epsilon$, replacing $\overline{\lambda}_0$ on the right side of the formula (6) with $\overline{\lambda}_\epsilon$ in the analytical perturbation model $\mathcal{M}_0$ to obtain a perturbation model $\mathcal{M}_\epsilon$, and obtaining a calculated value $\rho_c$ of the detection range corresponding to the detection moment $\hat{t}$ and a time change rate $\dot{\rho}_c$ of the calculated value based on the model $\mathcal{M}_\epsilon$ and in consideration of an impact of the light travel time; and
3) correcting and updating the along-track error according to $\epsilon=\epsilon+(\hat{\rho}-\Delta\rho-\rho_c)/\dot{\rho}_c$, and then performing the step 2) to perform recalculation until along-track errors before and after the update meet certain convergence accuracy, to obtain one along-track error;

for each of L sets of detection data obtained before the DLR system switches to the tracking process, wherein L≥1, generating one along-track error $\epsilon$ according to the above calculation process, wherein a finally determined along-track error is as follows:

$$\overline{\epsilon} = \sum \epsilon/L$$

correcting the along-track error of the initial quasi-mean elements based on the along-track error $\overline{\epsilon}$, and generating the tracking-specific guidance data based on the corrected initial quasi-mean elements, which specifically comprises:

performing calculation according to $\overline{\lambda}_{\overline{\epsilon}}=\overline{\lambda}_0+(\overline{n}_0+\lambda_1)\overline{\epsilon}$, replacing $\overline{\lambda}_0$ on the right side of the formula (6) with $\overline{\lambda}_{\overline{\epsilon}}$ in the analytical perturbation model $\mathcal{M}_0$ to obtain a perturbation model $\mathcal{M}_{\overline{\epsilon}}$, and calculating, based on the model $\mathcal{M}_{\overline{\epsilon}}$, the impact of the light travel time, and an atmospheric refraction effect, detection azimuths, detection elevations, and detection ranges that correspond to a series of detection moments, wherein the detection azimuth and the detection elevation are used to determine a tracking direction of the DLR system, and the detection range is used to perform range-gate filtering on tracking echo signals of the DLR system.

8. A computer-readable storage medium, wherein the computer-readable storage medium stores a computer program, and the computer program enables a computer to perform the search and tracking method for full time-domain laser detection of space debris according to claim 1.

9. An electronic device, comprising a memory, a processor, and a computer program stored in the memory and executable on the processor, wherein the processor, when executing the computer program, implements the search and tracking method for full time-domain laser detection of space debris according to claim 1.

10. The computer-readable storage medium according to claim 8, wherein the step of constructing the analytical perturbation model comprises:

selecting the intermediate moment $T_0$ of the current transit of the object as a reference moment, defining an orbital along-track error of the object during the current transit as an along-track error at the reference moment, and using the first-type nonsingular orbital elements as basic variables to construct an analytical perturbation model with the reference moment as the initial time;

assuming that one set of known precision orbital parameters of the object are $t_q$, $\vec{r}_q$, $\dot{\vec{r}}_q$, and $\epsilon_a$, wherein $t_q$ represents an epoch moment of the one set of orbital parameters, $\vec{r}_q$ and $\dot{\vec{r}}_q$ respectively represent a position vector and a velocity vector of the object relative to an epoch geocentric inertial coordinate system, and $\epsilon_a$ represents an area-mass ratio of the object, performing perturbation propagation by using a numerical method and a precision dynamic model based on the known orbital parameters $t_q$, $\vec{r}_q$, $\dot{\vec{r}}_q$, and $\epsilon_a$, performing propagation from the moment $t_q$ to the moment $T_0$ to obtain a position vector $\vec{r}_0$ and a velocity vector $\dot{\vec{r}}_0$ of the object relative to the epoch geocentric inertial coordinate system at the moment $T_0$, performing conversion on $\vec{r}_0$ and $\dot{\vec{r}}_0$ to obtain a set of initial quasi-mean elements of the object at the moment $T_0$, and constructing, based on the initial quasi-mean elements, an analytical perturbation model with a following mathematical expression:

assuming that a, i, $\Omega$, $\xi$=e cos $\omega$, $\eta$=–e sin $\omega$, and $\lambda$=$\omega$+M are first-type nonsingular osculating orbital elements of the object, wherein a represents an orbital semi-major axis, i represents an orbital inclination, $\Omega$ represents an orbital right ascension of ascending node, e represents an orbital eccentricity, $\omega$ represents an orbital argument of perigee, and M represents an orbital mean anomaly, obtaining following formulas:

$$a(t) = \bar{a}_0 + a_s^{(1)}(t) + a_s^{(2)}(t) \quad (1)$$

$$i(t) = \bar{i}_0 + i_s^{(1)}(t) + i_s^{(2)}(t) \quad (2)$$

$$\Omega(t) = \bar{\Omega}_0 + \Omega_1(t - T_0) + \Omega_s^{(1)}(t) + \Omega_s^{(2)}(t) \quad (3)$$

$$\xi(t) = \bar{\xi}_0 \cos[\omega_1(t - T_0)] + \bar{\eta}_0 \sin[\omega_1(t - T_0)] + \xi_s^{(1)}(t) + \xi_s^{(2)}(t) \quad (4)$$

$$\eta(t) = \bar{\eta}_0 \cos[\omega_1(t - T_0)] - \bar{\xi}_0 \sin[\omega_1(t - T_0)] + \eta_s^{(1)}(t) + \eta_s^{(2)}(t) \quad (5)$$

$$\lambda(t) = \bar{\lambda}_0 + (\bar{n}_0 + \lambda_1)(t - T_0) + \lambda_s^{(1)}(t) + \lambda_s^{(2)}(t) \quad (6)$$

wherein in the above formulas, a left side represents osculating elements at a moment t, $\bar{a}_0$, $\bar{i}_0$, $\bar{\Omega}_0$, $\bar{\xi}_0$, $\bar{\eta}_0$, and $\bar{\lambda}_0$ represent initial quasi-mean elements at the moment $T_0$, $\bar{n}_0 = \sqrt{\mu} \bar{a}_0^{-3/2}$ represents an angular velocity of mean motion of the object, $\mu$ represents the geocentric gravitational constant, $\Omega_1$, $\omega_1$, and $\lambda_1$ represent coefficients of first-order long-term variation items of corresponding elements, $a_s^{(1)}$, $i_s^{(1)}$, $\Omega_s^{(1)}$, $\xi_s^{(1)}$, $\eta_s^{(1)}$, and $\lambda_s^{(1)}$ represent first-order short-period variation items of various elements, and $a_s^{(2)}$, $i_s^{(2)}$, $\Omega_s^{(2)}$, $\xi_s^{(2)}$, $\eta_s^{(2)}$, and $\lambda_s^{(2)}$ represent second-order short-period variation items of the elements, which are reduced-order items related to rotation of the Earth.

11. The computer-readable storage medium according to claim 10, wherein the step of forming the apparent path cluster by different apparent paths generated from the virtual objects during the current transit comprises:

taking the along-track error of the initial quasi-mean elements as a random variable uniformly distributed within $[-\tau, \tau]$, discretizing the random variable to convert a probability problem into a certainty problem, and defining a following formula:

$$\bar{\lambda}_k = \bar{\lambda}_0 + (\bar{n}_0 + \lambda_1)k\Delta\tau \quad k = l, l-1, \ldots, 0, -1, \ldots, -l+1, -l$$

wherein $\Delta\tau$ represents a time increment, and assuming that $\varepsilon > 0$ is a small value, a value of $\Delta\tau$ is as follows:

$$\begin{cases} \Delta\tau = \varepsilon & \tau \geq 2\varepsilon \\ \Delta\tau = \tau/2 & \tau < 2\varepsilon \end{cases}$$

l is a positive integer, and is valued as follows:

$$l = \text{int}(\tau/\Delta\tau) + 1$$

in the constructed analytical perturbation model, replacing $\bar{\lambda}_0$ in the formula (6) with $\bar{\lambda}_k$, and keeping other formulas unchanged to obtain the series of new perturbation models, which are denoted as a model $\mathcal{M}_k$, wherein each model $\mathcal{M}_k$ corresponds to one virtual object, and a virtual object corresponding to $\mathcal{M}_0$ is a theoretical object; and when k continuously changes from l to –l, generating, by each virtual object, a series of apparent paths to form an apparent path cluster $\{\Gamma_k|_{l,-l}\}$, wherein each apparent path $\Gamma_k$ is uniquely determined by the model $\mathcal{M}_k$.

12. The computer-readable storage medium according to claim 11, wherein the step of obtaining the detection feature parameters of the virtual objects corresponding to all valid apparent paths when the virtual objects rise to the search elevation comprises:

for one apparent path $\Gamma_k$ in an apparent path cluster $\{\Gamma_k|_{m,n}\}$, wherein $\{\Gamma_k|_{m,n}\}$ represents an apparent path cluster obtained by removing the invisible apparent path and the apparent path with the unsatisfactory detectable arc length from $\{\Gamma_k|_{l,-l}\}$, performing search calculation forwards from a moment $\bar{t}_k$ of a closest approach point along a rising segment by using the dichotomous approach based on the model $\mathcal{M}_k$, generating, in each step, a position vector of the object relative to a True Equator and Mean Equinox of Epoch (TEMEE) coordinate system at a corresponding moment, calculating a corresponding detection elevation based on the position vector and by considering the impact of the light travel time and an atmospheric refraction effect, determining a processing method for a next step based on a difference between the detection elevation and the search elevation, and finally obtaining detection feature parameters of the object when the object rises to the search elevation, comprising a detection moment, a detection range, and a detection azimuth; and repeating the above process for other apparent paths in the apparent path cluster to obtain detection feature parameters corresponding to all virtual objects.

13. The computer-readable storage medium according to claim 12, wherein the step of generating the series of sets of search-specific guidance data comprises:

for one apparent path $\Gamma_k$ in the apparent path cluster $\{\Gamma_k|_{m,n}\}$, wherein a detection moment, a detection range, and a detection azimuth of a corresponding virtual object when the virtual object rises to the search elevation are respectively $t_k$, $\rho_k$, and $A'_k$, and $A'_k$ represents an azimuth after the continuation processing, taking $t_k$ as a base point, and constructing, through cubic spline interpolation based on the known parameter $\rho_k$ on the base point, an interpolation function in which a detection range $\rho$ varies with a detection moment t; and taking $A'_k$ as a base point, and constructing, through the cubic spline interpolation based on the known parameter $t_k$ on the base point, an interpolation function in which a detection moment t varies with a detection azimuth A', wherein the obtained interpolation functions are as follows:

$$\rho = \rho(t) \quad (9)$$

$$t = t(A') \quad (10)$$

a detection time scope when the real object rises to the search elevation is an effective search period, which is a closed interval $[t_m, t_n]$; a corresponding azimuth detection scope is a closed interval $[A'_m, A'_n]$, which corresponds to an azimuth interval; and when the DLR system performs search along the search elevation, a change interval for a direction of the laser beam is $[\psi_m, \psi_n]$, and a length of the interval is as follows:

$$\Delta\psi = |\psi_m - \psi_n|$$

a length of the azimuth interval of the object on the search elevation is as follows:

$$\Delta A = |A'_m - A'_n|$$

obtaining, based on a differential geometry relationship, the length of the change interval for the direction of the laser beam:

$$\Delta\psi = \cosh\Delta A$$

wherein h represents the search elevation of the DLR system;
evenly dividing the interval $[\psi_m, \psi_n]$ into a plurality of subintervals based on an effective diameter w of the laser beam, wherein a quantity of the subintervals obtained through the division is as follows:

$$N = \text{int}\left[\frac{\Delta\psi}{(1-\delta)w}\right] + 1$$

wherein $\delta$ represents a dimensionless scaling factor whose value is within an interval $[0,1)$; and the azimuth interval and $[\psi_m, \psi_n]$ are divided in a same manner, such that a length of an azimuth subinterval is as follows:

$$\Delta A^* = \Delta A / N$$

defining a symbol factor:

$$\kappa = \begin{cases} 1 & A'_m < A'_n \\ -1 & A'_m > A'_n \end{cases}$$

wherein azimuth subintervals are sequentially $[\tilde{A}^*_v, \tilde{A}^*_{v+1}]$, wherein $v=1, 2, \ldots, N$, such that two endpoint values of each azimuth subinterval are obtained by recursion as follows:

$$\tilde{A}^*_1 = A'_m$$
$$\tilde{A}^*_{v+1} = \tilde{A}^*_v + \kappa\Delta A^*$$

setting $[t^*_v, t^*_{v+1}]$ to be a time subinterval corresponding to the azimuth subinterval $[\tilde{A}^*_v, \tilde{A}^*_{v+1}]$, such that two endpoint values of the time subinterval are separately calculated according to the formula (10):

$$t^*_v = t(\tilde{A}^*_v)$$
$$t^*_{v+1} = t(\tilde{A}^*_{v+1})$$

calculating a center azimuth of the azimuth subinterval $[\tilde{A}^*_v, \tilde{A}^*_{v+1}]$ according to a following formula:

$$\tilde{A}^*_{v+1/2} = (\tilde{A}^*_v + \tilde{A}^*_{v+1})/2$$

calculating, according to the formula (10), a detection moment corresponding to the center azimuth:

$$t^*_{v+1/2} = t(\tilde{A}^*_{v+1/2})$$

calculating, according to the formula (9), a detection range corresponding to the center azimuth:

$$\rho^*_{v+1/2} = \rho(t^*_{v+1/2})$$

restoring the center azimuth $\tilde{A}^*_{v+1/2}$, which is a result obtained after the continuation processing, to an expression before the continuation processing, wherein a corresponding value $A^*_{v+1/2}$ is as follows:

$$A^*_{v+1/2} = \begin{cases} \tilde{A}^*_{v+1/2} - 2\pi & \tilde{A}^*_{v+1/2} \geq 2\pi \\ \tilde{A}^*_{v+1/2} + 2\pi & \tilde{A}^*_{v+1/2} < 0 \\ \tilde{A}^*_{v+1/2} & 0 \leq \tilde{A}^*_{v+1/2} < 2\pi \end{cases}$$

through the above processing process, generating a series of sets of search-specific guidance data $A^*_{v+1/2}$, $t^*_v$, $t^*_{v+1}$, and $\rho^*_{v+1/2}$, wherein $v=1, 2, \ldots, N$, $A^*_{v+1/2}$ represents an azimuth of the direction of the beam, $t^*_v$ and $t^*_{v+1}$ respectively represent start and end dwell moments of the beam, and $\rho^*_{v+1/2}$ represents a specified reference range of the object during the beam dwell.

14. The computer-readable storage medium according to claim 8, wherein the step of performing, by the DLR system, multi-elevation search on the object based on the search-specific guidance data comprises:
generating a series of gradually increasing search elevations according to a principle that search elevations are generated in an ascending order and effective search periods of the search elevations do not intersect with each other, generating search-specific guidance data for each search elevation, and starting, by the DLR system based on the search-specific guidance data for the corresponding search elevation, search from a start search elevation and gradually switching to a highest search elevation, wherein
the series of gradually increasing search elevations are generated according to following steps:
1) selecting a start search elevation $h^*$ between a minimum searchable elevation $h_p$ and a maximum searchable elevation $h_q$; presetting a constant $\chi$, wherein $\chi>0$ represents adjustment time required for the DLR system to switch from one search elevation to another search elevation; and setting k=1, $h_k$=h*, and $\tilde{h}$=h*, wherein $h_k$ represents a to-be-generated search elevation;

2) calculating an effective search period $[\tilde{t}_b, \tilde{t}_e]$ of the DLR system on the elevation $\tilde{h}$, and setting $h_n$=$\tilde{h}$ and $h_x$=$h_q$;

3) setting h=($h_n$+$h_x$)/2, calculating an effective search period $[t_b, t_e]$ of the DLR system on the elevation h, and performing calculation according to $\zeta = t_b - \tilde{t}_e - \chi$;

4) if $|\zeta| < \varepsilon_t$, setting k=k+1, $h_k$=h, and $\tilde{h}$=h, and performing the step 2) to continue the calculation, wherein $\varepsilon_t$ represents a given small value relative to $\chi$; otherwise, performing next calculation;

5) setting $\Delta h = h_q - h$; and if $\zeta < 0$ and $\Delta h < \varepsilon_h$, ending the calculation process, wherein $\varepsilon_h$ represents a given small value; otherwise, performing next calculation; and 6) if $\zeta < 0$, setting $h_n$=h, and performing the step 3) to continue the calculation; otherwise, setting $h_x$=h, and performing the step 3) to continue the calculation; and obtaining the series of gradually increasing search elevations $h_k$ according to the above setting method.

15. The computer-readable storage medium according to claim 11, wherein the step of calculating the along-track error of the initial quasi-mean elements based on a few sets of detection data obtained before switching to the tracking process, to correct the along-track error of the initial quasi-mean elements, and generating the tracking-specific guidance data based on the corrected initial quasi-mean elements comprises:

setting one set of detection data obtained by the DLR system before switching to the tracking process as $\hat{t}$ and $\hat{\rho}$, which is obtained during a certain dwell of the laser beam on a certain search elevation, wherein $\hat{t}$ represents a detection moment, $\hat{\rho}$ represents a corresponding detection range;

1) setting an iterative initial value $\epsilon$=0 of the along-track error, and using an atmospheric correction model to calculate a ranging delay $\Delta\rho$ caused by tropospheric refraction;

2) performing calculation according to $\overline{\lambda}_\epsilon = \overline{\lambda}_0 + (\overline{n}_0 + \lambda_1)\epsilon$, replacing $\overline{\lambda}_0$ on the right side of the formula (6) with $\overline{\lambda}_\epsilon$ in the analytical perturbation model $\mathcal{M}_0$ to obtain a perturbation model $\mathcal{M}_\epsilon$, and obtaining a calculated value $\rho_c$ of the detection range corresponding to the detection moment $\hat{t}$ and a time change rate $\dot{\rho}_c$ of the calculated value based on the model $\mathcal{M}_\epsilon$ and in consideration of an impact of the light travel time; and 3) correcting and updating the along-track error according to $\epsilon = \epsilon + (\hat{\rho} - \Delta\rho - \rho_c)/\dot{\rho}_c$, and then performing the step 2) to perform recalculation until along-track errors before and after the update meet certain convergence accuracy, to obtain one along-track error;

for each of L sets of detection data obtained before the DLR system switches to the tracking process, wherein L≥1, generating one along-track error $\epsilon$ according to the above calculation process, wherein a finally determined along-track error is as follows:

$$\bar{\epsilon} = \sum \epsilon / L$$

correcting the along-track error of the initial quasi-mean elements based on the along-track error $\bar{\epsilon}$, and generating the tracking-specific guidance data based on the corrected initial quasi-mean elements, which specifically comprises:

performing calculation according to $\overline{\lambda}_{\bar{\epsilon}} = \overline{\lambda}_0 + (\overline{n}_0 + \lambda_1)\bar{\epsilon}$, replacing $\overline{\lambda}_0$ on the right side of the formula (6) with $\overline{\lambda}_{\bar{\epsilon}}$ in the analytical perturbation model $\mathcal{M}_0$ to obtain a perturbation model $\mathcal{M}_{\bar{\epsilon}}$, and calculating, based on the model $\mathcal{M}_{\bar{\epsilon}}$, the impact of the light travel time, and an atmospheric refraction effect, detection azimuths, detection elevations, and detection ranges that correspond to a series of detection moments, wherein the detection azimuth and the detection elevation are used to determine a tracking direction of the DLR system, and the detection range is used to perform range-gate filtering on tracking echo signals of the DLR system.

16. The electronic device according to claim 9, wherein the step of constructing the analytical perturbation model comprises:

selecting the intermediate moment $T_0$ of the current transit of the object as a reference moment, defining an orbital along-track error of the object during the current transit as an along-track error at the reference moment, and using the first-type nonsingular orbital elements as basic variables to construct an analytical perturbation model with the reference moment as the initial time:

assuming that one set of known precision orbital parameters of the object are $t_q$, $\vec{r}_q$, $\dot{\vec{r}}_q$, and $\epsilon_a$, wherein $t_q$ represents an epoch moment of the one set of orbital parameters, $\vec{r}_q$ and $\dot{\vec{r}}_q$ respectively represent a position vector and a velocity vector of the object relative to an epoch geocentric inertial coordinate system, and $\epsilon_a$ represents an area-mass ratio of the object, performing perturbation propagation by using a numerical method and a precision dynamic model based on the known orbital parameters $t_q$, $\vec{r}_q$, $\dot{\vec{r}}_q$, and $\epsilon_a$, performing propagation from the moment $t_q$ to the moment $T_0$ to obtain a position vector $\vec{r}_0$ and a velocity vector $\dot{\vec{r}}_0$ of the object relative to the epoch geocentric inertial coordinate system at the moment $T_0$, performing conversion on $\vec{r}_0$ and $\dot{\vec{r}}_0$ to obtain a set of initial quasi-mean elements of the object at the moment $T_0$, and constructing, based on the initial quasi-mean elements, an analytical perturbation model with a following mathematical expression:

assuming that a, i, $\Omega$, $\xi$=e cos $\omega$, $\eta$=−e sin $\omega$, and $\lambda$=$\omega$+M are first-type nonsingular osculating orbital elements of the object, wherein a represents an orbital semi-major axis, i represents an orbital inclination, $\Omega$ represents an orbital right ascension of ascending node, e represents an orbital eccentricity, $\omega$ represents an orbital argument of perigee, and M represents an orbital mean anomaly, obtaining following formulas:

$$a(t) = \overline{a}_0 + a_s^{(1)}(t) + a_s^{(2)}(t) \qquad (1)$$

$$i(t) = \overline{\iota}_0 + i_s^{(1)}(t) + i_s^{(2)}(t) \qquad (2)$$

$$\Omega(t) = \overline{\Omega}_0 + \Omega_1(t - T_0) + \Omega_s^{(1)}(t) + \Omega_s^{(2)}(t) \qquad (3)$$

$$\xi(t) = \overline{\xi}_0 \cos[\omega_1(t - T_0)] + \overline{\eta}_0 \sin[\omega_1(t - T_0)] + \xi_s^{(1)}(t) + \xi_s^{(2)}(t) \qquad (4)$$

-continued $$\eta(t) = \overline{\eta}_0 \cos[\omega_1(t - T_0)] - \overline{\xi}_0 \sin[\omega_1(t - T_0)] + \eta_s^{(1)}(t) + \eta_s^{(2)}(t) \quad (5)$$

$$\lambda(t) = \overline{\lambda}_0 + (\overline{n}_0 + \lambda_1)(t - T_0) + \lambda_s^{(1)}(t) + \lambda_s^{(2)}(t) \quad (6)$$

wherein in the above formulas, a left side represents osculating elements at a moment t, $\overline{a}_0$, $\overline{i}_0$, $\overline{\Omega}_0$, $\overline{\xi}_0$, $\overline{\eta}_0$, and $\overline{\lambda}_0$ represent initial quasi-mean elements at the moment $T_0$, $\overline{n}_0 = \sqrt{\mu}\overline{a}_0^{-3/2}$ represents an angular velocity of mean motion of the object, $\mu$ represents the geocentric gravitational constant, $\Omega_1$, $\omega_1$, and $\lambda_1$ represent coefficients of first-order long-term variation items of corresponding elements, $a_s^{(1)}$, $i_s^{(1)}$, $\Omega_s^{(1)}$, $\xi_s^{(1)}$, $\eta_s^{(1)}$, and $\lambda_s^{(1)}$ represent first-order short-period variation items of various elements, and $a_s^{(2)}$, $i_s^{(2)}$, $\Omega_s^{(2)}$, $\xi_s^{(2)}$, $\eta_s^{(2)}$, and $\lambda_s^{(2)}$ represent second-order short-period variation items of the elements, which are reduced-order items related to rotation of the Earth.

17. The electronic device according to claim 16, wherein the step of forming the apparent path cluster by different apparent paths generated from the virtual objects during the current transit comprises:

taking the along-track error of the initial quasi-mean elements as a random variable uniformly distributed within $[-\tau, \tau]$, discretizing the random variable to convert a probability problem into a certainty problem, and defining a following formula:

$$\overline{\lambda}_k = \overline{\lambda}_0 + (\overline{n}_0 + \lambda_1)k\Delta\tau \quad k = l, l-1, \ldots, 0, -1, \ldots, -l+1, -l$$

wherein $\Delta\tau$ represents a time increment, and assuming that $\varepsilon > 0$ is a small value, a value of $\Delta\tau$ is as follows:

$$\begin{cases} \Delta\tau = \varepsilon & \tau \geq 2\varepsilon \\ \Delta\tau = \tau/2 & \tau < 2\varepsilon \end{cases}$$

l is a positive integer, and is valued as follows:

$$l = \text{int}(\tau/\Delta\tau) + 1$$

in the constructed analytical perturbation model, replacing $\overline{\lambda}_0$ in the formula (6) with $\overline{\lambda}_k$, and keeping other formulas unchanged to obtain the series of new perturbation models, which are denoted as a model $\mathcal{M}_k$, wherein each model $\mathcal{M}_k$ corresponds to one virtual object, and a virtual object corresponding to $\mathcal{M}_0$ is a theoretical object; and when k continuously changes from l to $-l$, generating, by each virtual object, a series of apparent paths to form an apparent path cluster $\{\Gamma_k|_{l,-l}\}$, wherein each apparent path $\Gamma_k$ is uniquely determined by the model $\mathcal{M}_k$.

* * * * *